US012780228B2

(12) United States Patent
Takimoto et al.

(10) Patent No.: US 12,780,228 B2
(45) Date of Patent: Nov. 3, 2026

(54) VEHICLE CONTROL APPARATUS, VEHICLE CONTROL METHOD, AND VEHICLE CONTROL SYSTEM

(71) Applicant: Hitachi Astemo, Ltd., Hitachinaka (JP)

(72) Inventors: Koki Takimoto, Hitachinaka (JP); Daisuke Goto, Hitachinaka (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 53 days.

(21) Appl. No.: 18/842,525

(22) PCT Filed: Mar. 10, 2023

(86) PCT No.: PCT/JP2023/009218
§ 371 (c)(1),
(2) Date: Aug. 29, 2024

(87) PCT Pub. No.: WO2023/210182
PCT Pub. Date: Nov. 2, 2023

(65) Prior Publication Data

US 2025/0178618 A1 Jun. 5, 2025

(30) Foreign Application Priority Data

Apr. 27, 2022 (JP) ................................ 2022-073211

(51) Int. Cl.
*B60W 50/00* (2006.01)
*B60T 8/96* (2006.01)
(Continued)

(52) U.S. Cl.
CPC ............. *B60W 50/029* (2013.01); *B60T 8/96* (2013.01); *B60W 10/04* (2013.01); *B60W 10/192* (2013.01); *B60W 30/02* (2013.01)

(58) Field of Classification Search
None
See application file for complete search history.

(56) References Cited

U.S. PATENT DOCUMENTS 6,412,885 B1 7/2002 Shirai et al.
2003/0065435 A1* 4/2003 Krueger .................... B60T 8/48 180/197

(Continued)

FOREIGN PATENT DOCUMENTS

JP 2016-83949 5/2016
WO 99/02384 1/1999

OTHER PUBLICATIONS

International Search Report issued May 23, 2023 in International Application No. PCT/JP2023/009218, with English translation.

(Continued)

*Primary Examiner* — Truc M Do
(74) *Attorney, Agent, or Firm* — Wenderoth, Lind & Ponack, L.L.P.

(57) ABSTRACT

An Electronic Control Unit (ECU) is configured to control electric brake mechanisms configured to provide respective braking forces to respective wheels of a vehicle. When a first braking force provided to a first wheel cannot be controlled due to a failure in a first frictional braking apparatus, the ECU is configured to output a braking instruction for causing a second frictional braking apparatus to generate a second braking force according to magnitude of the first braking force.

10 Claims, 8 Drawing Sheets

(51) Int. Cl.

| | |
|---|---|
| ***B60W 10/04*** | (2006.01) |
| ***B60W 10/192*** | (2012.01) |
| ***B60W 30/02*** | (2012.01) |
| ***B60W 50/029*** | (2012.01) |

(56) References Cited

U.S. PATENT DOCUMENTS

2007/0176486 A1* 8/2007 Nakamura ............. B60K 6/365 303/DIG. 2
2010/0127562 A1* 5/2010 Yokoyama .............. B60T 8/267 303/151
2011/0320099 A1* 12/2011 Kim ...................... B60T 13/746 701/70
2015/0298552 A1* 10/2015 Ferrer-Dalmau Nieto .................. B60L 58/20 903/907
2017/0182986 A1* 6/2017 Dackermann ........... B62L 3/023
2017/0210361 A1* 7/2017 Kotera .................. F16D 55/226
2020/0339081 A1* 10/2020 Suzuki ...................... B60T 8/17
2021/0276427 A1* 9/2021 Yamamoto ................ B60L 7/26

OTHER PUBLICATIONS

Written Opinion of the International Searching Authority issued May 23, 2023 in International Application No. PCT/JP2023/009218, with English translation.

* cited by examiner

CS: COUNTERSTEER
SBW: STEERING-BY-WIRE

VEHICLE CONTROL APPARATUS, VEHICLE CONTROL METHOD, AND VEHICLE CONTROL SYSTEM

CROSS-REFERENCE TO RELATED APPLICATIONS

The present application claims priority under the Paris Convention to Japanese Patent Application No. 2022-073211 filed on Apr. 27, 2022. The entire disclosure of Japanese Patent Application No. 2022-073211 including the specification, the claims, the drawings, and the abstract is incorporated herein by reference in its entirety.

TECHNICAL FIELD

The present invention relates to, for example, a vehicle control apparatus, a vehicle control method, and a vehicle control system.

BACKGROUND ART

Japanese Patent Application Publication No. 2016-83949 discloses a braking force control apparatus for an electric vehicle. The electric vehicle drives a drive wheel using an electric motor. When a short-circuit failure is detected in one of left and right electric motors of the vehicle, this braking force control apparatus for the electric vehicle provides a braking force to a wheel laterally opposite from the electric motor where the short-circuit failure is detected. A braking force is generated on the drive wheel on the faulty side due to a circulating current when the short-circuit failure occurs in one of the left and right electric motors, and the application of the braking force to the laterally opposite wheel can suppress a difference between the left and right braking forces, thereby reducing occurrence of a yaw moment unintended by a driver (an operator).

SUMMARY OF INVENTION

Technical Problem

However, Japanese Patent Application Publication No. 2016-83949 does not take into consideration an influence exerted on the behavior of the vehicle by an unintended braking force generated due to a failure in a frictional braking apparatus. Therefore, the vehicle behavior may lose stability when the unintended braking force is generated due to the failure in the frictional braking apparatus.

Solution to Problem

According to one aspect of the present invention, a vehicle control apparatus includes a control portion configured to control a first frictional braking apparatus and a second frictional braking apparatus. The first frictional braking apparatus is configured to provide a braking force to a first wheel, which is one of left and right wheels of a vehicle. The second frictional braking apparatus is configured to provide a braking force to a second wheel portion, which is the other wheel portion of the left and right wheels of the vehicle. When a first braking force provided to the first wheel cannot be controlled due to a failure in the first frictional braking apparatus, the control portion outputs a braking instruction for causing the second frictional braking apparatus to generate a second braking force according to magnitude of the first braking force.

According to another aspect of the present invention, a vehicle control method is configured to be performed by a control unit. The control unit is configured to control a first frictional braking apparatus and a second frictional braking apparatus. The first frictional braking apparatus is configured to provide a braking force to a first wheel, which is one of left and right wheels of a vehicle. The second frictional braking apparatus is configured to provide a braking force to a second wheel portion, which is the other wheel portion of the left and right wheels of the vehicle. The vehicle control method includes causing the control unit to, when a first braking force provided to the first wheel cannot be controlled due to a failure in the first frictional braking apparatus, output a braking instruction for causing the second frictional braking apparatus to generate a second braking force according to magnitude of the first braking force.

According to further another aspect of the present invention, a vehicle control system includes a first frictional braking apparatus configured to provide a braking force to a first wheel, which is one of left and right wheels of a vehicle, a second frictional braking apparatus configured to provide a braking force to a second wheel portion, which is the other wheel portion of the left and right wheels of the vehicle, and a control unit configured to control the first frictional braking apparatus and the second frictional braking apparatus. The control unit is configured to, when a first braking force provided to the first wheel cannot be controlled due to a failure in the first frictional braking apparatus, output a braking instruction for causing the second frictional braking apparatus to generate a second braking force according to magnitude of the first braking force.

According to the aspects of the present invention, the vehicle behavior can be prevented from losing stability under an unintended braking force generated due to a failure in the frictional braking apparatus.

BRIEF DESCRIPTION OF DRAWINGS

FIG. 6 illustrates characteristic line diagrams (time graphs) indicating one example of time-series changes in the “acceleration/deceleration request (a deceleration request)”, a “braking force of each wheel”, an “acceleration/deceleration instruction (a deceleration instruction)”, and the like.

FIG. 7 illustrates characteristic line diagrams (time graphs) indicating another example (first another example) of the time-series changes in the “acceleration/deceleration request (the deceleration request)”, the “braking force of each wheel”, the “acceleration/deceleration instruction (the deceleration instruction)”, and the like.

FIG. 8 illustrates characteristic line diagrams (time graphs) indicating another example (second another example) of the time-series changes in the “acceleration/ deceleration request (the deceleration request)", the "braking force of each wheel", the "acceleration/deceleration instruction (the deceleration instruction)", and the like.

DESCRIPTION OF EMBODIMENTS

In the following description, a vehicle control apparatus, a vehicle control method, and a vehicle control system according to an embodiment will be described citing an example in which they are applied to a four-wheeled automobile with reference to the accompanying drawings. Each step in a flowchart illustrated in FIG. 3 will be represented by a symbol "S" (for example, each step will be indicated like step 1="S1"). Further, lines with two slash marks added thereto in FIG. 1 indicate electricity-related lines. Further, indexes "L" and "R" correspond to "left" and "right", respectively.

Figure 1:
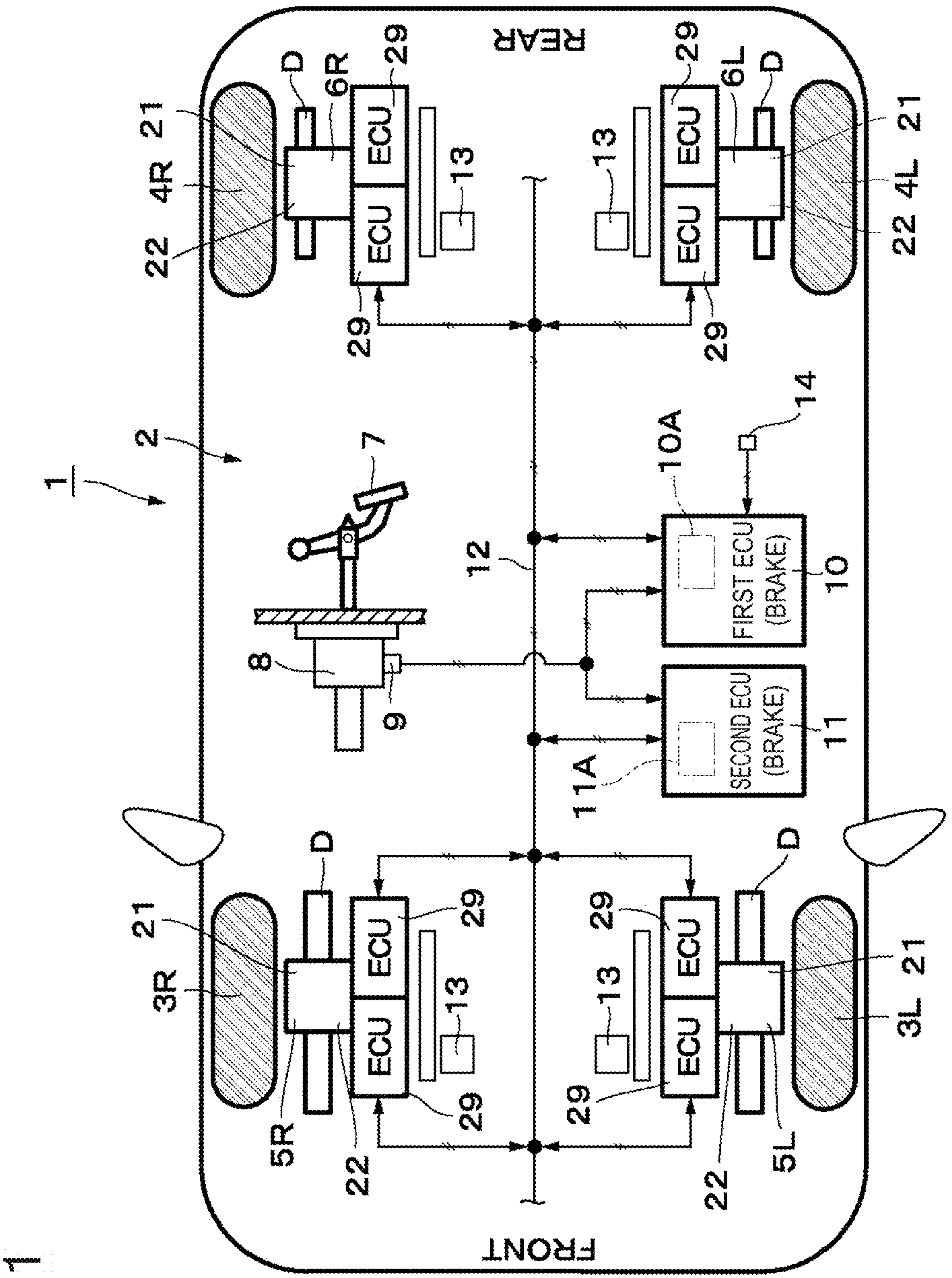
FIG. 1 is a schematic view illustrating a vehicle on which a vehicle control apparatus and a vehicle control system according to an embodiment are mounted.

FIG. 1 illustrates a vehicle system. In FIG. 1, a vehicle 1 is equipped with a brake apparatus 2 (a brake system), which provides braking forces to wheels 3 and 4 (front wheels 3L and 3R and rear wheels 4L and 4R) to brake the vehicle 1. The vehicle 1 includes a steering apparatus (a steering system) that steers the vehicle 1, although not illustrated. The steering apparatus can be constructed using an electric steering system such as an electric power steering system or a steering-by-wire system. In the case where the steering apparatus is constructed using the electric steering system, for example, the steering apparatus can be configured to be able to autonomously steer the vehicle 1 based on driving of an electric motor of the electric steering system. In this case, the vehicle 1 can be steered by driving the electric motor independently of an operation input by a driver (an operator).

Further, the vehicle 1 includes a power transmission apparatus (a power train system) including an engine (an internal combustion engine), an electric motor (an electric motor for running), a clutch device, a transmission, and/or a reduction mechanism, although not illustrated. In the embodiment, the driving (acceleration) and the braking (deceleration) of the vehicle 1 can be realized by the power train system and/or the brake apparatus 2 (the brake system) according to an acceleration/deceleration request based on an operation performed by the driver on an accelerator pedal (not illustrated) and a brake pedal 7, and/or an acceleration/deceleration request from a superior vehicle control ECU (not illustrated).

As illustrated in FIG. 1, the brake apparatus 2 includes left and right front wheel-side electric brake mechanisms 5L and 5R (front braking mechanisms) mounted in correspondence with a left-side front wheel 3L (a left front wheel 3L) and a right-side front wheel 3R (a right front wheel 3R), left and right rear wheel-side electric brake mechanisms 6L and 6R (rear braking mechanisms) mounted in correspondence with a left-side rear wheel 4L (a left rear wheel 4L) and a right-side rear wheel 4R (a right rear wheel 4R), the brake pedal 7 (an operation tool) as a brake operation member, a pedal reaction force device 8 (hereinafter referred to as a pedal simulator 8) that generates a kickback reaction force according to an operation (pressing) on the brake pedal 7, and a pedal stroke sensor 9 as an operation detection sensor that measures an amount by which the driver operates the brake pedal 7.

The left and right front wheel-side electric brake mechanisms 5L and 5R and the left and right rear wheel-side electric brake mechanisms 6L and 6R (hereinafter also referred to as the electric brake mechanisms 5 and 6) are each formed by, for example, an electric disk brake. In other words, the electric brake mechanisms 5 and 6 provide the braking forces to the wheels 3 and 4 (the front wheels 3L and 3R and the rear wheels 4L and 4R) based on driving of electric motors 23 (refer to FIG. 2). As will be described below, in the embodiment, a speed reduction mechanism 24 (refer to FIG. 2) of each of the electric brake mechanisms 5 and 6 has a function of refraining from being reversely actuated when the current of the electric motor 23 is set to zero. Therefore, at the time of parking brake, a thrust force can be maintained by setting the current of the electric motor 23 to zero with the thrust force generated by the electric motor 23. In other words, each of the electric brake mechanisms 5 and 6 is configured to be able to provide parking brake even without including a parking mechanism such as a ratchet mechanism (a lock mechanism).

The pedal stroke sensor 9 is mounted on, for example, the pedal simulator 8. The pedal stroke sensor 9 may be mounted on the brake pedal 7. Further, a pressing force sensor that measures a pressing force corresponding to the operation amount of the brake pedal 7 may be used instead of the pedal stroke sensor 9. The pedal stroke sensor 9 is connected to a first brake control ECU 10 and a second brake control ECU 11, each of which is an ECU (Electronic Control Unit) for brake control.

The first brake control ECU 10 (also referred to as the first ECU 10) and the second brake control ECU 11 (also referred to as the second ECU 11) are provided to the vehicle 1. The first ECU 10 and the second ECU 11 each include a microcomputer equipped with a central processing unit (a CPU), a storage device (a memory), a control board, and the like. The first ECU 10 and the second ECU 11 correspond to a vehicle control apparatus and a control unit. The first ECU 10 and the second ECU 11 calculate a braking force (a target braking force) for each of the wheels (the four wheels) according to a predetermined control program in reaction to an input of a signal from the pedal stroke sensor 9.

The first ECU 10 calculates, for example, a target braking force that should be provided on the left-side front wheel 3L and the right-side rear wheel 4R. The first ECU 10 outputs (transmits) a braking instruction directed to each of the two wheels, the left-side front wheel 3L and the right-side rear wheel 4R to electric brake ECUs 29 and 29 via a CAN 12 (Controller Area Network) serving as a vehicle data bus based on the calculated target braking force. The second ECU 11 calculates, for example, a target braking force that should be provided on the right-side front wheel 3R and the left-side rear wheel 4L. The second ECU 11 outputs (transmits) a braking instruction directed to each of the two wheels, the right-side front wheel 3R and the left-side rear wheel 4L to the electric brake ECUs 29 and 29 via the CAN 12 based on the calculated target braking force.

To perform such control regarding braking, the first ECU 10 and/or the second ECU 11 include(s) control portions 10A and/or 11A (FIG. 1), which make(s) a calculation based on input information (for example, the signal from the pedal stroke 9) and outputs a result of the calculation (for example, a control instruction according to a target thrust force). Further, the electric brakes ECU 29 each include a control portion 29A (FIG. 2), which makes a calculation based on input information (for example, a signal corresponding to the braking instruction from the first ECU 10 and/or the second ECU 11) and outputs a result of the calculation (for example, a driving current for driving the electric motor 23).

Wheel speed sensors 13 and 13 are mounted near the front wheels 3L and 3R and the rear wheels 4L and 4R, respectively. The wheel speed sensors 13 and 13 detect the speeds of these wheels 3L, 3R, 4L, and 4R (a wheel speed). The wheel speed sensors 13 and 13 are connected to the first ECU 10 and the second ECU 11. The first ECU 10 and the second ECU 11 can acquire the wheel speed of each of the wheels 3L, 3R, 4L, and 4R based on a signal from each of the wheel speed sensors 13 and 13.

Further, the first ECU 10 and the second ECU 11 receive vehicle information transmitted from another ECU mounted on the vehicle 1 (for example, a power train system ECU, a prime mover ECU, a transmission ECU, a steering ECU, an autonomous driving ECU, or the superior vehicle control ECU, which are not illustrated) via the CAN 12. For example, the first ECU 10 and the second ECU 11 can acquire various kinds of vehicle information such as information about the position of the ΔT range or the position of the MT shift, information about ON/OFF of the ignition, information about the engine speed, information about the power train torque, information about the transmission gear ratio, information about a steering wheel operation, information about a clutch operation, information about an accelerator operation, information about inter-vehicle communication, information about surroundings around the vehicle that is acquired by an in-vehicle camera, and information from the acceleration sensor (a longitudinal acceleration and a lateral acceleration) via the CAN 12.

A parking brake switch 14 is mounted near the driver's seat. The parking brake switch 14 is connected to the first ECU 10 (and the second ECU 11 via the CAN 12). The parking brake switch 14 transmits a signal (an actuation request signal) corresponding to a request to actuate the parking brake (an application request working as a holding request or a release request working as a stop request) according to an operation instruction from the driver to the first ECU 10 and the second ECU 11. The first ECU 10 and the second ECU 11 transmit a parking brake instruction directed to any of the four wheels (for example, all of the four wheels, any three wheels, or any two wheels) to the electric brake ECUs 29 and 29 based on the operation performed on the parking brake switch 14 (the actuation request signal). The parking brake switch 14 corresponds to a switch that actuates the parking brake.

Figure 2:
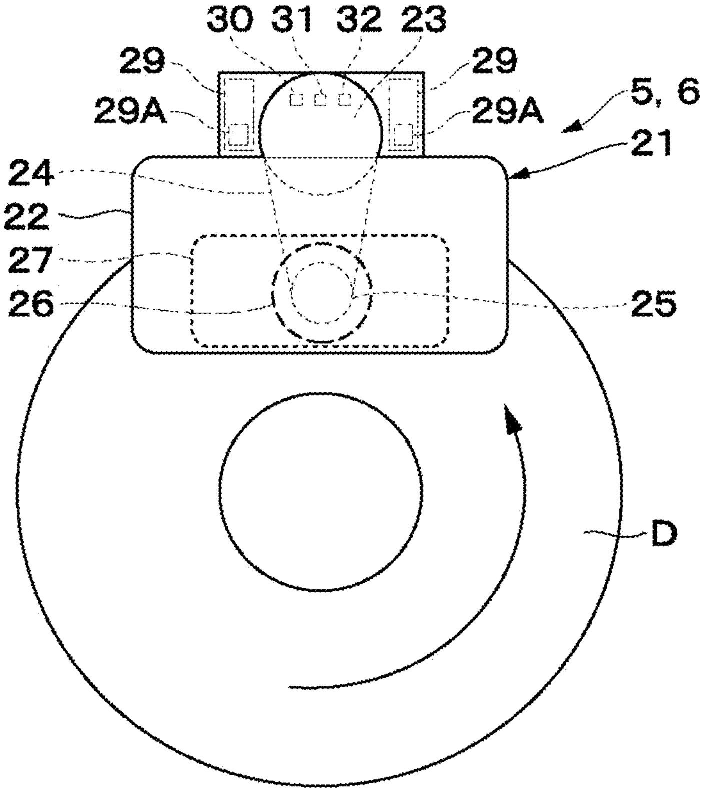
FIG. 2 is a schematic view illustrating an electric brake mechanism on a front wheel side and a rear wheel side illustrated in FIG. 1 together with a disk rotor.

As illustrated in FIGS. 1 and 2, the left and right front wheel-side electric brake mechanisms 5L and 5R (hereinafter also referred to as the electric brake mechanisms 5) are each formed as an electric brake mechanism including two electric brake ECUs 29. More specifically, the left front electric brake mechanism 5L as a frictional braking apparatus includes a brake mechanism 21, the electric motor 23, and the two electric brake ECUs 29. The right front electric brake mechanism 5R as the frictional braking apparatus includes the brake mechanism 21, the electric motor 23, and the two electric brake ECUs 29.

Further, as illustrated in FIGS. 1 and 2, the left and right rear wheel-side electric brake mechanisms 6L and 6R (hereinafter also referred to as the electric brake mechanisms 6) are also each formed as an electric brake mechanism including two electric brake ECUs 29. More specifically, the left rear electric brake mechanism 6L as the frictional braking apparatus includes the brake mechanism 21, the electric motor 23, and the two electric brake ECUs 29. The right rear electric brake mechanism 6R as the frictional braking apparatus includes the brake mechanism 21, the electric motor 23, and the two electric brake ECUs 29.

The electric brake mechanisms 5 and 6 each control the position and the thrust force of the brake mechanism 21. To achieve this control, as illustrated in FIG. 2, the brake mechanism 21 includes a rotational angle sensor 30, a thrust force sensor 31, and a current sensor 32. The rotational angle sensor 30 serves as a position detector that detects a motor rotational position. The thrust force sensor 31 serves as a thrust force detector that detects a thrust force (a piston thrust force). The current sensor 32 serves as a current detector that detects a motor current.

The electric motor 23 is mounted on the brake mechanism 21. The brake mechanism 21 includes, for example, a caliper 22 as a cylinder (a wheel cylinder), a piston 26 as a pressing member, and brake pads 27 as a friction member (a braking member or a pad), as illustrated in FIG. 2. Further, the brake mechanism 21 includes the electric motor 23 as an electric motor (an electric actuator), a speed reduction mechanism 24, and a rotation-linear motion conversion mechanism 25.

The electric motor 23 is driven (rotated) according to the supply of electric power thereto, and thrusts forward the piston 26. By this operation, the electric motor 23 provides the braking force (a frictional braking force). The electric motor 23 is controlled by the electric brakes ECU 29 and 29 based on the braking instruction from the first ECU 10 or the second ECU 11. The speed reduction mechanism 24 is formed by, for example, a gear speed reduction mechanism, and transmits the rotation of the electric motor 23 to the rotation-linear motion conversion mechanism 25 while slowing down it.

The rotation-linear motion conversion mechanism 25 converts the rotation of the electric motor 23 transmitted via the speed reduction mechanism 24 into an axial displacement of the piston 26 (a linear-motion displacement). The piston 26 is thrust forward due to the driving of the electric motor 23, and moves the brake pads 27. The brake pads 27 are pressed against the disk rotor D by the piston 26. The disk rotor D also called a brake disk corresponds to a friction receiving member (a braking receiving member or a disk). The disk rotor D rotates together with the wheel 3L, 3R, 4L, or 4R. In the embodiment, the brake mechanism 21 does not include a fail-open mechanism (a return spring) that provides a rotational force to a rotational member of the rotation-linear motion conversion mechanism 25 in a braking release direction at the time of the braking application.

In the brake mechanism 21, the piston 26 is thrust forward so as to press the brake pads 27 against the disk rotor D based on the driving of the electric motor 23. In other words, the brake mechanism 21 transmits the thrust force generated based on the driving of the electric motor 23 to the piston 26, which moves the brake pads 27, according to the braking instruction (a deceleration instruction) based on the braking request (a deceleration request) from the driver or the autonomous driving system.

In the embodiment, the speed reduction mechanism 24 of each of the left and right front wheel-side electric brake mechanisms 5L and 5R and the left and right rear wheel-side electric brake mechanisms 6L and 6R has the function of refraining from being reversely actuated when the current of the electric motor 23 is set to zero. Therefore, at the time of the parking brake, the thrust force can be maintained by setting the motor current to zero after the thrust force is generated. At the time of the release, the thrust force can be reduced by supplying a current toward a thrust force reduction side. At the time of the parking brake, the thrust force may be generated on the four wheels or may be generated on any two wheels (for example, the two rear wheels or the two front wheels) or any three wheels.

As illustrated in FIGS. 1 and 2, the electric brake ECUs 29 are provided in correspondence with each of the respective brake mechanisms 21, i.e., each of the brake mechanism 21 on the left front wheel 3L side, the brake mechanism 21 on the right front wheel 3R side, the brake mechanism 21 on the left rear wheel 4L side, and the brake mechanism 21 on the right rear wheel 4R side. In this case, the two electric brake ECUs 29 are provided to one brake mechanism 21. The two electric brake ECUs 29, for example, perform the same processing in parallel and also mutually monitor whether there is a difference between the processing results. Due to that, even when a failure has occurred in one of the electric brake ECUs 29, the control can continue (can be backed up) by the other electric ECU 29. In other words, the electric brake ECU 29 can be redundantly arranged.

The electric brake ECU 29 includes a microcomputer and a driving circuit (for example, an inverter). The electric brake ECU 29 controls the brake mechanism 21 (the electric motor 23) based on an instruction from the first ECU 10 or the second ECU 11. In other words, the electric brake ECU 29 forms a control apparatus (the brake control apparatus) that controls the actuation of the electric motor 23 together with the first ECU 10 and the second ECU 11. In this case, the electric brake ECU 29 controls the driving of the electric motor 23 based on the braking instruction. The braking instruction (the braking instruction signal) is input from the first ECU 10 or the second ECU 1I to the electric brake ECU 29.

As illustrated in FIG. 2, the rotational angle sensor 30 detects the rotational angle of the rotational shaft of the electric motor 23 (a motor rotational angle). The rotational angle sensor 30 is mounted in correspondence with each of the respective electric motors 23 of the brake mechanisms 21. The rotational angle sensor 30 forms the position detector that detects the rotational position of the electric motor 23 (the motor rotational position) and thus the piston position. The thrust force sensor 31 detects a reaction force to the thrust force (the pressing force) applied from the piston 26 to the brake pads 27. The thrust force sensor 31 is mounted in correspondence with each of the respective brake mechanisms 21. The thrust force sensor 31 forms the thrust force detector that detects the thrust force applied to the piston 26 (the piston thrust force).

The current sensor 32 detects the current supplied to the electric motor 23 (the motor current). The current sensor 32 is mounted in correspondence with each of the respective electric motors 23 of the brake mechanisms 21. The current sensor 32 forms the current detector that detects the motor current (a motor torque current) of the electric motor 23. The rotational angle sensor 30, the thrust force sensor 31, and the current sensor 32 are connected to the electric brake ECUs 29.

The electric brake ECUs 29 (and the first ECU 10 and the second ECU 11 connected to these electric brake ECU 29 via the CAN 12) can acquire the rotational angle of the electric motor 23 based on the signal from the rotational angle sensor 30. The electric brake ECUs 29 (and the first ECU 10 and the second ECU 11) can acquire the thrust force applied to the piston 26 based on the signal from the thrust force sensor 31. The electric brake ECUs 29 (and the first ECU 10 and the second ECU 11) can acquire the motor current supplied to the electric motor 23 based on the signal from the current sensor 32.

Next, the operations of applying the braking and releasing the braking by the electric brake mechanisms 5 and 6 will be described. In the following description, these operations will be described citing the operations when the driver operates the brake pedal 7 as an example. However, the electric brake mechanisms 5 and 6 also operate approximately similarly even in the case of autonomous brake, except for, for example, such a difference that an instruction for the autonomous brake is output from an autonomous brake ECU (not illustrated), the first ECU 10, or the second ECU 11 to the electric brake ECUs 29.

For example, when the driver operates the brake pedal 7 by pressing it while the vehicle 1 runs, the first ECU 10 and the second ECU 11 output an instruction according to the pressing operation on the brake pedal 7 (the braking instruction according to the target thrust force instruction value) to the electric brake ECUs 29 based on the detection signal input from the pedal stroke sensor 9. The electric brake ECUs 29 drive (rotate) the electric motor 23 in a forward direction, i.e., in a braking application direction (an applying direction) based on the instruction from the first ECU 10 and the second ECU 11. The rotation of the electric motor 23 is transmitted to the rotation-linear motion conversion mechanism 25 via the speed reduction mechanism 24, and the piston 26 is moved forward toward the brake pads 27. As a result, the brake pads 27 are pressed against the disk rotor D, and the braking force is applied. At this time, the braking state is established due to the control on the driving of the electric motor 23 based on the detection signals from the pedal stroke sensor 9, the rotational angle sensor 30, the thrust force sensor 31, and the like.

On the other hand, when the brake pedal 7 is operated toward a pressing release side, the first ECU 10 and the second ECU 11 output an instruction according to this operation (the braking instruction according to the target thrust force instruction value) to the electric brake ECUs 29. The electric brake ECUs 29 drive (rotate) the electric motor 23 in a reverse direction, i.e., in a braking release direction (a releasing direction) based on the instruction from the first ECU 10 and the second ECU 11. The rotation of the electric motor 23 is transmitted to the rotation-linear motion conversion mechanism 25 via the speed reduction mechanism 24, and the piston 26 is moved backward in a direction away from the brake pads 27. Then, when the pressing of the brake pedal 7 is completely released, the brake pads 27 are separated from the disk rotor D, thereby releasing the braking force.

Next, the thrust force control and the position control by the electric brake mechanisms 5 and 6 will be described.

The first ECU 10 and the second ECU 11 determine the braking force that should be generated by each of the electric brake mechanisms 5 and 6, i.e., the target thrust force to be generated on the piston 26 based on the detection data from the various kinds of sensors (for example, the pedal stroke sensor 9), the autonomous brake instruction, and/or the like. The first ECU 10 and the second ECU 11 output the braking instruction according to the target thrust force to the electric brake ECUs 29. The electric brake ECUs 29 perform thrust force control based on the piston thrust force detected by the thrust force sensor 31 as a feedback and positional control based on the motor rotational position detected by the rotational angle sensor 30 as a feedback on the electric motor 23 so as to generate the target thrust force on the piston 26.

In other words, in the brake mechanism 21, the thrust force of the piston 26 is adjusted based on the braking instruction (the target thrust force) from the first ECU 10 and the second ECU 11 and a feedback signal from the thrust force sensor 31, which measures the thrust force of the piston 26. To determine the thrust force, the brake mechanism 21 performs torque control of the electric motor 23 via the rotation-linear motion conversion mechanism 25 and the speed reduction mechanism 24, i.e., current control based on a feedback signal of the current sensor 32, which measures the current amount supplied to the electric motor 23. Therefore, the braking force, the piston thrust force, the torque of the electric motor 23 (the motor torque), the current value, and the piston position (a value indicating the number of rotations of the electric motor 23 that is measured by the rotational angle sensor 30) are in a correlated relationship. However, the control based on the thrust force sensor 31, which detects (measures) the piston thrust force (the piston pressing force) strongly correlated with the braking force, is desirable because the braking force varies depending on the environment and a variation in the components.

The thrust force sensor 31 can be formed by, for example, a strain sensor that deforms a metallic strain generation element in reaction to the force of the piston 26 in the thrust direction and detects the strain amount thereof. The strain sensor is a strain IC, and includes piezoresistance for detecting a strain at the center of the top surface of a silicon chip with a Wheatstone bridge, an amplification circuit, and a semiconductor process disposed around it. The strain sensor detects the strain applied to the strain sensor as a resistance change by utilizing the piezoresistance effect. The strain sensor may be formed by a strain gauge or the like. The thrust force sensor 31 may be omitted in a case where a unit for estimating the thrust force (a thrust force estimation unit) is provided.

Then, Japanese Patent Application Publication No. 2016-83949 discloses a braking force control apparatus for an electric vehicle. The electric vehicle drives a drive wheel using an electric motor. When a short-circuit failure is detected in one of left and right electric motors of this electric vehicle, this braking force control apparatus provides a braking force to a wheel laterally opposite from the electric motor where the short-circuit failure is detected. However, Japanese Patent Application Publication No. 2016-83949 does not take into consideration an influence exerted on the behavior of the vehicle by an unintended braking force generated due to a failure in a frictional braking apparatus (for example, a braking force unintended by a driver or a braking force unintended by an autonomous driving system). Therefore, the vehicle behavior may lose stability when a failure has occurred in the frictional braking apparatus on one of the left and right wheels of the vehicle, such as when the braking force of one of the wheels becomes unable to be released. More specifically, under a deceleration unintended by the driver or the autonomous driving system that occurs due to the failure wheel, the vehicle may be decelerated excessively or insufficiently relative to the request from the driver or the autonomous driving system, ending up losing the stability of the behavior thereof.

In light thereof, the embodiment is configured to provide a braking force equivalent to the failure wheel (the faulty wheel) to the wheel opposite in the lateral direction of the vehicle from the failure wheel (the faulty wheel) where the braking force generated by the frictional braking apparatus is unintentionally held. More specifically, the embodiment generates the “braking force equivalent to the braking force of the failure wheel”, a “braking force smaller than the braking force of the failure wheel by a predetermined amount”, or a “braking force greater than the braking force of the failure wheel by a predetermined amount” on the wheel laterally opposite from the failure wheel. Further, the embodiment outputs an acceleration/deceleration instruction (an acceleration instruction or a deceleration instruction) according to an acceleration/deceleration request (an acceleration request or a deceleration request) requested to the vehicle. Due to that, the embodiment prevents the vehicle behavior from losing stability under the unintended braking force generated due to the failure in the frictional braking apparatus.

For example, suppose that a deceleration request from the driver or the autonomous driving system is more than twice the magnitude of the braking force generated on the failure wheel. In this case, the magnitude of the braking force of the wheel laterally opposite from the failure wheel is calculated so as to exceed the braking force of the failure wheel by a predetermined amount according to the difference from the deceleration request, and this calculated braking force is generated. Further, a deceleration force (a deceleration torque or a brake torque) is calculated as necessary, and a request (a deceleration instruction) for generating this calculated deceleration force is output to the power train system. By this operation, the difference reduces between the deceleration request and the actually generated deceleration of the vehicle.

On the other hand, for example, suppose that the deceleration request from the driver or the autonomous driving system is less than twice the magnitude of the braking force generated on the failure wheel. In this case, the magnitude of the braking force of the wheel (a normal wheel) laterally opposite from the failure wheel is calculated so as to fall below the braking force of the failure wheel by a predetermined amount according to the difference from the deceleration request, and this calculated braking force is generated. Further, an acceleration force (an acceleration torque or an accelerator torque) is calculated as necessary, and a request (an acceleration instruction) for generating this calculated acceleration force is output to the power train system. By this operation, the difference reduces between the deceleration request and the actually generated deceleration of the vehicle.

Further, for example, suppose that an acceleration request is issued from the driver or the autonomous driving system. In this case, an acceleration force (an acceleration torque or an accelerator torque) acquired by adding the “acceleration request” to the “sum of the braking force of the failure wheel and the braking force of the wheel laterally opposite from the failure wheel)” is calculated, and a request (an acceleration request) for generating this calculated acceleration force is output to the power train system. By this operation, the acceleration request can be realized (achieved) even when the braking force of the failure wheel and the braking force of the wheel (the normal wheel) laterally opposite from the failure wheel are generated. In other words, the difference can reduce between the acceleration request and the actually generated acceleration of the vehicle. The details thereof will be described now.

In the embodiment, the vehicle 1 includes the electric brake mechanisms 5 and 6 as the frictional braking apparatus, and the first ECU 10 and/or the second ECU 11 (hereinafter also referred to as the ECU(s) 10 and/or 11) as the vehicle control apparatus and the control unit. In the embodiment, the vehicle 1 includes the four electric brake mechanisms 5 and 6, i.e., the left front electric brake mechanism 5L mounted in correspondence with the left front wheel 3L, the right front electric brake mechanism 5R mounted in correspondence with the right front wheel 3R, the left rear electric brake mechanism 6L mounted in correspondence with the left rear wheel 4L, and the right rear electric brake mechanism 6R mounted in correspondence with the right rear wheel 4R. The left front electric brake mechanism 5L provides the braking force to the left front wheel 3L of the vehicle 1. The right front electric brake mechanism 5R provides the braking force to the right front wheel 3R of the vehicle 1. The left rear electric brake mechanism 6L provides the braking force to the left rear wheel 4L of the vehicle 1. The right rear electric brake mechanism 6R provides the braking force to the right rear wheel 4R of the vehicle 1.

The ECU(s) 10 and/or 1I control(s) the electric brake mechanisms 5L, 5R, 6L, and 6R. The ECU(s) 10 and/or 11 include(s) a control portion 10A and/or a control portion 11A (hereinafter also referred to as the control portion(s) 10A and/or 11A), which control(s) the electric brake mechanisms 5L, 5R, 6L, and 6R. The electric brake mechanisms 5L, 5R, 6L, and 6R, and the ECU(s) 10 and/or 11 form a vehicle control system that controls the vehicle 1, more specifically, a vehicle braking control system (a vehicle acceleration/deceleration control system) that controls the braking (the acceleration if necessary) of the vehicle 1.

Then, the ECU(s) 10 and/or 11 (i.e., the control portion(s) 10A and/or 11A) perform(s) the following control when a failure in one of the electric brake mechanisms 5L, 5R, 6L, and 6R makes it impossible to control the braking force provided by this failed electric brake mechanism 5L, 5R, 6L, or 6R. That is, the ECU(s) 10 and/or 11 (the control portion(s) 10A and/or 11A) output(s) a braking instruction to cause the electric brake mechanism 5L, 5R, 6L, or 6R opposite in the lateral direction of the vehicle 1 from the failed electric brake mechanism 5L, 5R, 6L, or 6R to generate a braking force according to the magnitude of the braking force provided by the failed electric brake mechanism 5L, 5R, 6L, or 6R.

Examples of the "failure in the electric brake mechanism 5L, 5R, 6L, or 6R" include a mechanical failure in the brake mechanism 21 itself, and a failure in the electric brake ECU 29 that controls the brake mechanism 21. In other words, the "failure in the electric brake mechanism 5L, 5R, 6L, or 6R" also includes being unable to control the braking force provided by the brake mechanism 21 due to a secondary failure in the electric brake ECU 29 set as the redundant ECU. Further, examples of "being unable to control the braking force" include when the braking force provided by the brake mechanism 21 cannot be released and is kept held, when a braking force weaker than the braking force provided by the brake mechanism 21 remains, and when the braking force provided by the brake mechanism 21 cannot be controlled in an increasing direction (including when the braking force is kept at zero).

In the following description, the embodiment will be described mainly referring to an example in which the braking force provided to the left front wheel 3L cannot be controlled due to a failure in the left front electric brake mechanism 5L, which provides the braking force to the left front wheel 3L of the vehicle 1, more specifically, the braking force provided to the left front wheel 3L cannot be released due to a failure in the left front electric brake mechanism 5L. When a failure occurs in the right front electric brake mechanism 5R, the left rear electric brake mechanism 6L, or the right rear electric brake mechanism 6R, the embodiment functions in a manner similar to the failure in the left front electric brake mechanism 5L except for the difference in left/right side and/or front/rear side, and therefore the descriptions thereof will be omitted herein.

The braking force provided to the left front wheel 3L due to the failure in the left front electric brake mechanism 5L, i.e., the unreleasable braking force will be referred to as a first braking force. In this case, the ECU(s) 10 and/or 11 (the control portion(s) 10A and/or 11A) output(s) a braking instruction for causing the right front electric brake mechanism 5R to generate a second braking force according to the magnitude of the first braking force. At this time, the ECU(s) 10 and/or 11 (the control portion(s) 10A and/or 11A) can output the braking instruction to generate the second braking force to, for example, the electric brake ECUs 29 of the right front electric brake mechanism 5R.

The second braking force may be generated by the right rear electric brake mechanism 6R. In this case, the ECU(s) 10 and/or 11 (the control portion(s) 10A and/or 11A) output(s) a braking instruction for causing the right rear electric brake mechanism 6R to generate the second braking force. At this time, the ECU(s) 10 and/or 11 (the control portion(s) 10A and/or 11A) can output the braking instruction to generate the second braking force to, for example, the electric brake ECUs 29 of the right rear electric brake mechanism 6R. Alternatively, the second braking force may be generated by the right front electric brake mechanism 5R and the right rear electric brake mechanism 6R. In this case, the ECU(s) 10 and/or 11 (the control portion(s) 10A and/or 11A) output(s) a braking instruction for causing the right front electric brake mechanism 5R and the right rear electric brake mechanism 6R to generate the second braking force. At this time, the ECU(s) 10 and/or 11 (the control portion(s) 10A and/or 11A) can output the braking instruction to generate the second braking force to, for example, the electric brake ECUs 29 of the right front electric brake mechanism 5R and the electric brake ECUs 29 of the right rear electric brake mechanism 6R.

Further, the ECU(s) 10 and/or 11 (the control portion(s) 10A and/or 11A) output(s) an acceleration/deceleration instruction according to the relationship between the "magnitude of the first braking force" and the "magnitude of the acceleration/deceleration request requested to the vehicle1". At this time, the ECU(s) 10 and/or 11 (the control portion(s) 10A and/or 11A) can output the acceleration/deceleration request to, for example, the ECU of the power train system and/or the electric brake ECUs 29 of the left rear electric brake mechanism 6L. The acceleration/deceleration request requested to the vehicle 1 corresponds to, for example, the acceleration/deceleration request (the acceleration request or the deceleration request) from the driver or the acceleration/deceleration request (the acceleration request or the deceleration request) from the autonomous driving system. The acceleration/deceleration instruction corresponds to the acceleration/deceleration instruction (the acceleration instruction or the deceleration instruction) directed to, for example, the power train system and/or the left rear electric brake mechanism 6L. Due to that, the braking force (the brake torque) or the acceleration force (the accelerator torque) required in the power train system and/or the left rear electric brake mechanism 6L is generated. The acceleration/deceleration instruction may be output directly from the ECU(s) 10 and/or 11 (the control portion(s) 10A and/or 11A) to the ECU of the power train system and/or the electric brake ECUs 29, or may be, for example, output from the ECU(s) 10 and/or 11 (the control portion(s) 10A and/or 11A) to the ECU of the power train system and/or the electric brake ECUs 29 via the superior vehicle control ECU.

Figure 3:
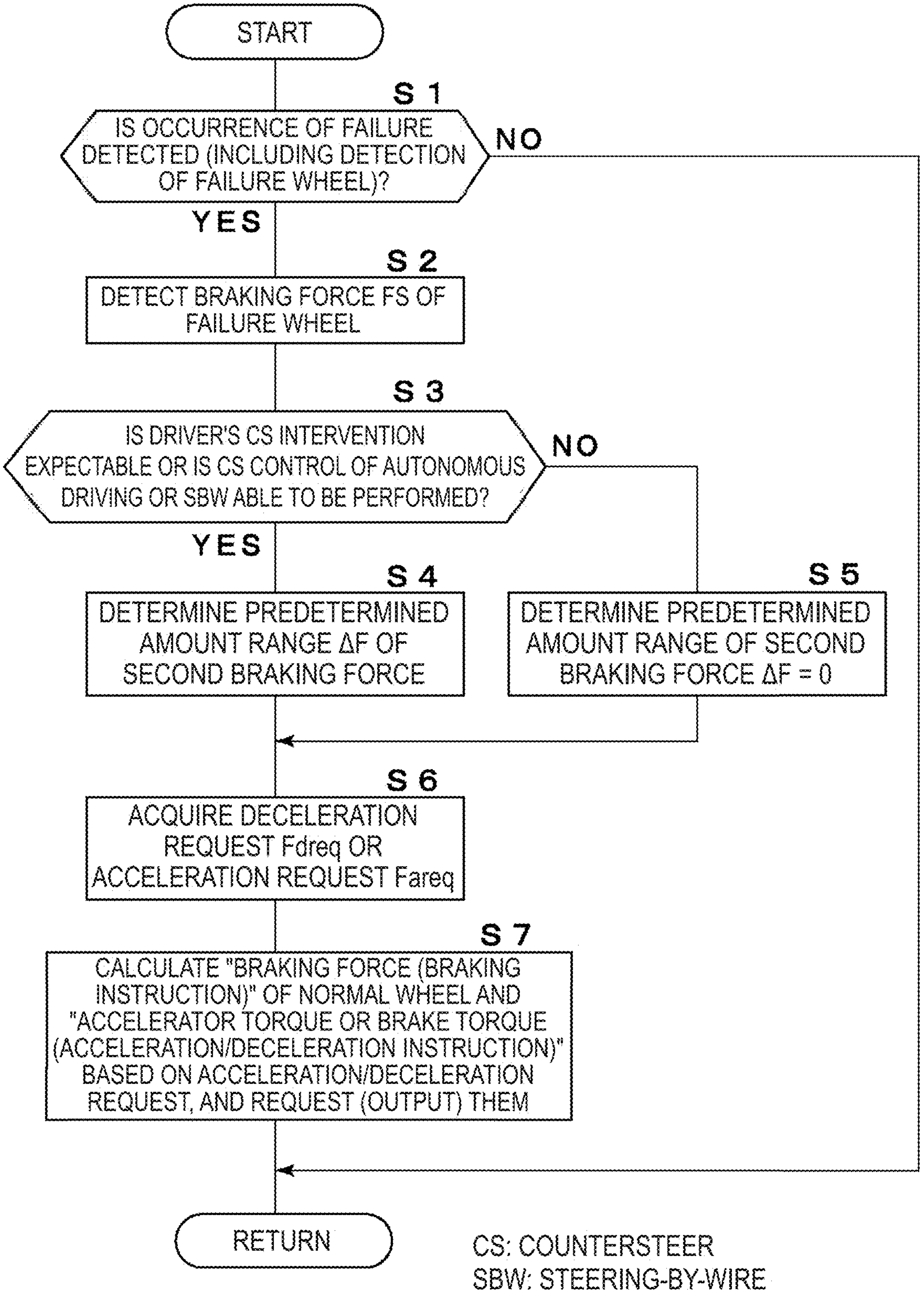
FIG. 3 is a flowchart illustrating control processing performed by a first ECU (and/or a second ECU) illustrated in FIG. 1.

FIG. 3 illustrates control processing performed by the ECU(s) 10 and/or 11 (the control portion(s) 10A and/or 11A). FIG. 3 illustrates a processing flow of outputting the braking instruction and the acceleration/deceleration instruction as necessary according to the "magnitude of the first braking force", the "magnitude of the second braking force according to the magnitude of the first braking force", and the "magnitude of the acceleration/deceleration request". The processing flow illustrated in FIG. 3 is started in reaction to, for example, a startup of the first ECU 10 and/or the second ECU 11. The processing illustrated in FIG. 3 is repeatedly performed per predetermined control period.

In the following description, the processing illustrated in FIG. 3 will be described assuming that this is performed by the first ECU 10 by way of example. However, the processing illustrated in FIG. 3 may be performed by, for example, the second ECU 11. Alternatively, for example, the processing illustrated in FIG. 3 may be performed by both the first ECU 10 and the second ECU 11 independently of each other. In this case, the embodiment may be configured in such a manner that any one of the first ECU 10 and the second ECU 11 determines consistency between the processing result yielded by the first ECU 10 and the processing result yielded by the second ECU 11 and then outputs a final processing result (the control instruction or the acceleration/deceleration instruction). Further alternatively, the processing illustrated in FIG. 3 may be performed by the electric brake ECU 29 (the control portion 29A). Further alternatively, the processing illustrated in FIG. 3 may be performed by an ECU different from the first ECU 10, the second ECU 11, and the electric brake ECU 29.

After the processing illustrated in FIG. 3 is started, in S1, the first ECU 10 detects occurrence of a failure. In other words, in S1, the first ECU 10 detects a failure wheel due to a failure in the electric brake mechanism 5L, 5R, 6L, or 6R. More specifically, the first ECU 10 identifies which has failed, the electric brake mechanism 5L, 5R, 6L, or 6R, and also determines where the failed electric brake mechanism 5L, 5R, 6L, or 6R is mounted, the wheel 3L, 3R, 4L, or 4R. The failure can be detected by, for example, a method in which the electric brake ECU 29 itself detects the failure based on a sensor signal or the like and notifies the first ECU 10, or a method in which the first ECU 10 determines the failure based on a disconnection of communication with the electric brake ECU 29 or the like.

If "NO" is determined in S1, i.e., no failure is detected, the processing returns. In other words, the processing returns to START via RETURN, and S1 and the steps subsequent thereto are repeated. On the other hand, if "YES" is determined in S1. i.e., a failure is detected, the processing proceeds to S2. In S2, the braking force generated on the failure wheel is detected. For example, when the failure has occurred in the left front electric brake mechanism 5L, the braking force generated on the left front wheel 3L, which is the failure wheel, is detected. This braking force, i.e., the braking force generated on the failure wheel (the left front wheel 3L) will be referred to as the "first braking force". The first braking force can be, for example, the braking force on the failure wheel (the left front wheel 3L) immediately before the failure has occurred. Alternatively, if the thrust sensor value of the brake mechanism 21 on the failure wheel (the left front wheel 3L) is normal, the first braking force may be calculated based on this thrust force sensor value. Further, even when the magnitude of the first braking force generated on the failure wheel (the left front wheel 3L) is zero, the following processing continues. In other words, even when the value of the first braking force is zero, the continuation of the following processing allows the braking instruction and/or the acceleration/deceleration instruction to be output in S7, which will be described below.

In S3 subsequent to S2, the first ECU 10 determines whether a countersteer operation (a countersteering operation) of the driver is expectable. In this case, the first ECU 10 determines, for example, whether countersteer control (countersteering control) can be performed in the case of a vehicle equipped with an autonomous driving system or a vehicle equipped with a steering-by-wire system. Now, the braking force generated on the electric brake mechanism 5R and/or 6R of the normal wheel (the right front wheel 3R and/or the right rear wheel 4R) opposite in the lateral direction of the vehicle 1 from the failure wheel (the left front wheel 3L) will be referred to as a "second braking force". If a braking force greater or smaller than the magnitude of the first braking force by a predetermined amount is generated as this second braking force, a yaw moment is generated due to the difference in braking force between the left and right wheels of the vehicle 1. This raises the necessity of causing the countersteer (the countersteering) to intervene to cancel the yaw moment to thus stabilize the vehicle behavior when a braking force greater or smaller than the first braking force by the predetermined amount is generated as this second braking force. In view of that, in S3, the first ECU 10 determines whether the driver or the autonomous control can countersteer.

Figure 4:
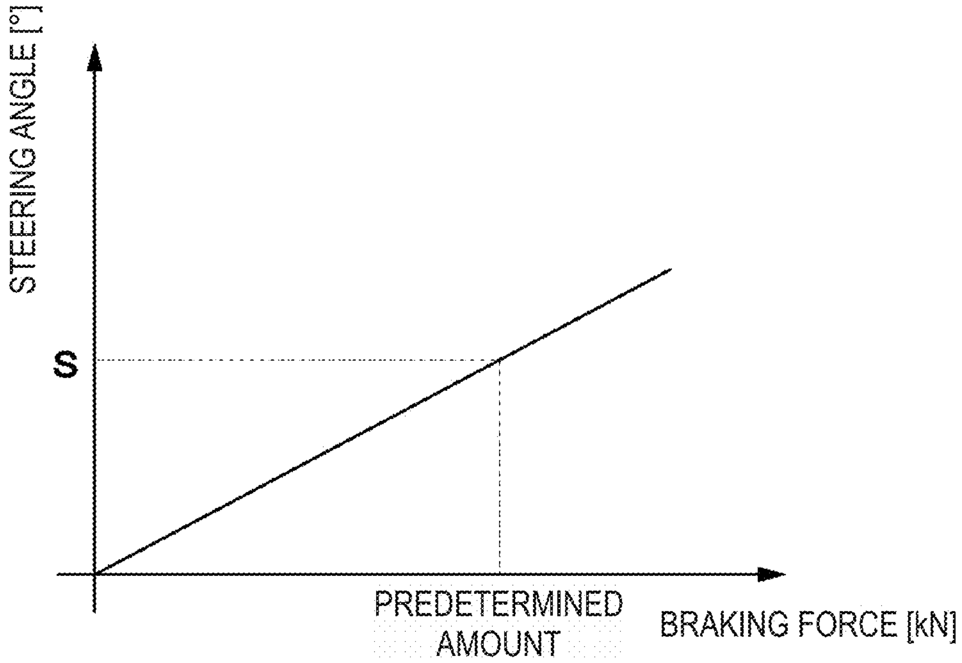
FIG. 4 is a characteristic line diagram illustrating one example of the relationship between a “predetermined amount” and a “steering angle”.
Figure 5:
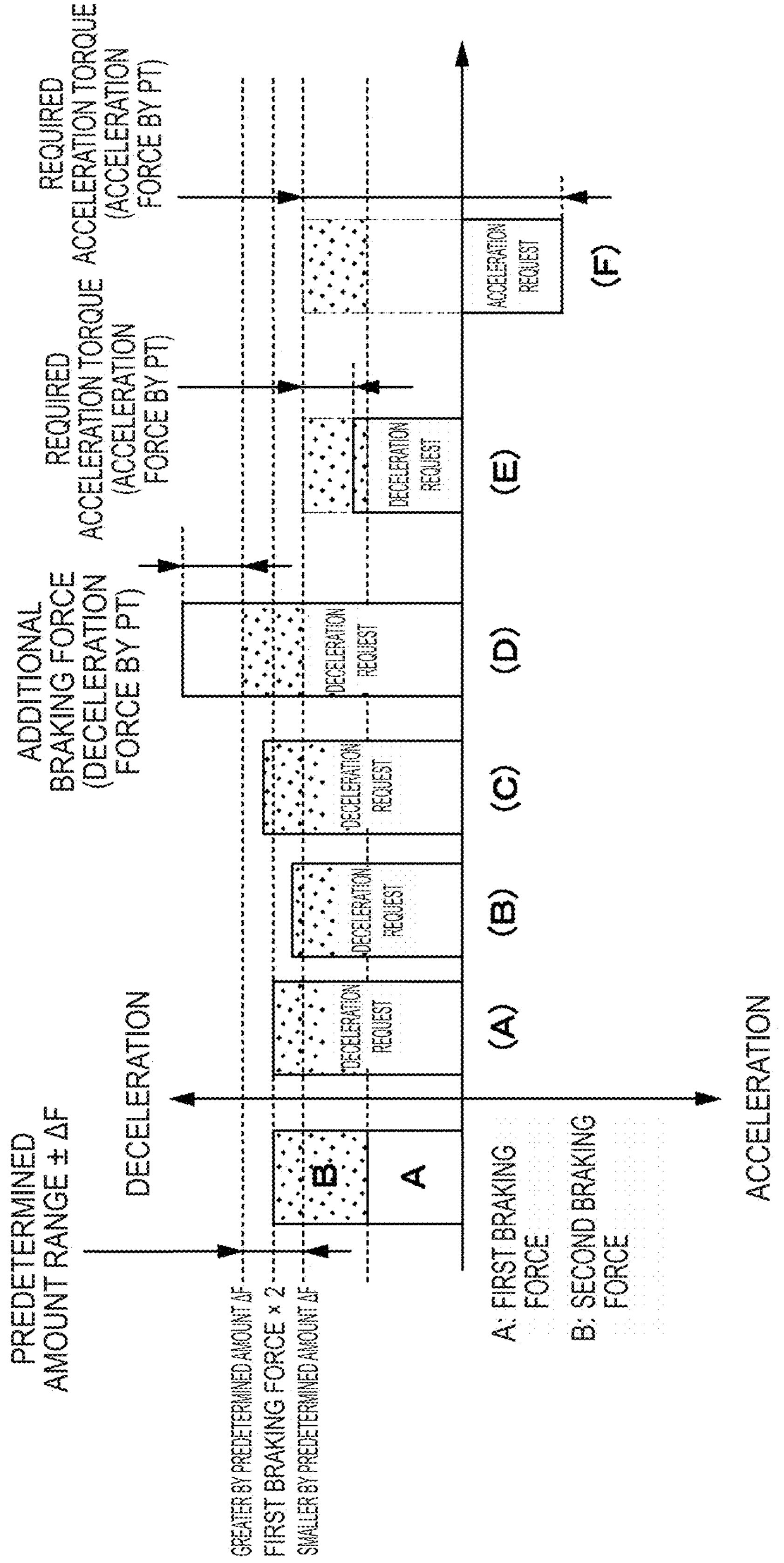
FIG. 5 illustrates the relationship among “magnitude of a first braking force”, “magnitude of a second braking force”, and “magnitude of an acceleration/deceleration request”.

If "YES" is determined in S3, i.e., the countersteer operation is determined to be expectable or the countersteer control is determined to be able to be performed, the processing proceeds to S4. In S4, a predetermined amount range (±ΔF) of the second braking force is determined. The predetermined amount range (±ΔF) is a range (±ΔF) of magnitude of a braking force increasable or reducible from the magnitude of the first braking force as the magnitude of the second braking force as illustrated in FIG. 5, which will be described below. The predetermined amount range (±ΔF) can be determined based on, for example, a relationship (a map or a calculation equation) between the "predetermined amount (the predetermined amount ΔF of the braking force addable to or subtractable from the magnitude of the first braking force)" and a "steering angle (a countersteer angle)" like an example illustrated in FIG. 4.

The predetermined amount ΔF can be determined based on a safety goal that should be achieved as the vehicle 1 (a vehicle sideways movement amount or the like) and a moment amount (an estimated moment amount) estimated from a countersteer amount expected to be achievable by the driver. The relationship between the "predetermined amount" and the "steering angle" illustrated in FIG. 4 can be determined from, for example, an experiment in advance. More specifically, an experiment of causing the driver to perform a steering operation while the first braking force and the second braking force (a braking force acquired by adding or subtracting the predetermined amount ΔF to or from the first braking force) are generated is conducted in advance. Due to this experiment, the relationship between a steering operation amount (the steering angle) and the predetermined amount ΔF capable of keeping the vehicle behavior allowable can be set in advance.

In S3, the predetermined amount range (±ΔF) of the second braking force can be determined based on the relationship between the "predetermined amount" and the "steering angle" preset from such an experiment. Alternatively, in a case of a vehicle equipped with a system capable of autonomously steering the vehicle independently of the driver's steering amount, such as a steering-by-wire system, the predetermined amount ΔF can be determined based on a moment amount (an estimated moment amount) achievable by this steering system. In this manner, in the embodiment, the magnitude of the second braking force is set to a value acquired by adding or subtracting the predetermined amount ΔF to or from the magnitude of the first braking force in relation to the countersteer amount. Adding or subtracting the predetermined amount ΔF in this manner can bring about the following advantages.

For example, when the driver requests an acceleration, an increase in the predetermined amount ΔF can lead to a reduction in the second braking force, thereby resulting in a reduction in the deceleration generated from the first braking force and the second braking force. As a result, the acceleration torque (the acceleration instruction) required to the power train system to satisfy the driver's request can be reduced. On the other hand, when the driver's deceleration request is less than twice the magnitude of the first braking force, an increase in the predetermined amount ΔF can lead to a reduction in the second braking force, thereby resulting in a reduction in the deceleration generated from the first braking force and the second braking force. As a result, the acceleration torque (the acceleration instruction) required to the power train system to satisfy the driver's request can be reduced.

Further, when the driver's deceleration request is more than twice the magnitude of the first braking force, an increase in the predetermined amount ΔF can lead to an increase in the second braking force, thereby resulting in an increase in the deceleration generated from the first braking force and the second braking force. As a result, the deceleration torque (the deceleration instruction) required to the power train system to satisfy the driver's request can be reduced. On the other hand, when the driver's deceleration request falls within the predetermined amount range (±ΔF) from twice the magnitude of the first braking force, i.e., falls within the range of the predetermined amount ΔF added to or subtracted from twice the magnitude of the first braking force, zero can be set as the deceleration torque (the deceleration instruction) or the acceleration torque (the acceleration instruction) required to the power train system to satisfy the driver's request. When the driver additionally turns the steering wheel, the steering amount is additionally increased or reduced according to the additional amount of turning the steering wheel. As a result, the predetermined amount ΔF can be determined while the additional amount of turning the steering wheel is reflected therein.

On the other hand, if "NO" is determined in S3, i.e., the countersteer operation is determined not to be expectable or the countersteer control is determined not to be able to be performed, the processing proceeds to S5. In S5, the predetermined amount range (±ΔF) of the second braking force is determined to be "zero". In other words, in this case, the first braking force and the second braking force are set to the same magnitude, thereby preventing a moment from being generated based on the difference in braking force between the first braking force and the second braking force. For example, in a case where a road surface p is low, the predetermined amount range (±ΔF) of the second braking force may also be determined to be "zero" even while the vehicle 1 is being turned. In other words, when no moment based on the difference in braking force between the first braking force and the second braking force is allowable, the predetermined amount range (±ΔF) of the second braking force can be set to "zero". After the predetermined amount range (±ΔF) of the second braking force is determined in S4 or S5, the processing proceeds to S6.

In S6, the request from the driver or the request from the autonomous driving system is acquired. In other words, in S6, the acceleration/deceleration request corresponding to the driver's operation amount for acceleration/deceleration or the acceleration/deceleration request from the autonomous driving system is acquired. The acceleration/deceleration request will be referred to as an acceleration request Fareq if requesting an acceleration of the vehicle 1 and to a deceleration request Fdreq if requesting a deceleration of the vehicle 1. After the acceleration request Fareq or the deceleration request Fdreq is acquired in S6, the processing proceeds to S7. In S7, the first ECU 10 calculates a "braking force to be generated on the normal wheel laterally opposite from the failure wheel", a "braking force to be generated on the normal wheel on the laterally same side as the failure wheel", and an "acceleration/deceleration torque (an accelerator torque or a brake torque) to be output from the power train system" based on the deceleration request Fdreq or the acceleration request Fareq acquired in S6.

For example, when the failure has occurred in the left front electric brake mechanism 5L, the first ECU 10 calculates a "braking force" to be generated on the right front wheel 3R, the right rear wheel 4R, and/or the left rear wheel 4L, and an "acceleration/deceleration torque (an accelerator torque or a brake torque)" to be generated on the right front wheel 3R, the right rear wheel 4R, and/or the left rear wheel 4L by the power train system. In this case, the "braking force" and the "acceleration/deceleration torque (the accelerator torque or the brake torque)" are calculated in consideration of the magnitude relationship between the "braking force on the normal w % heel (the right front wheel 3R, the right rear wheel 4R, and/or the left rear wheel 4L) and the "deceleration request Fdreq or the acceleration request Fareq".

The calculated "braking force" and "acceleration/deceleration torque (accelerator torque or brake torque)" correspond to the instructions (requests) directed to the electric brake ECUs 29 and the ECU of the power train system. In other words, the first ECU 10 outputs (transmits) the calculated "braking force" and "acceleration/deceleration torque (accelerator torque or brake torque)" to the electric brake ECUs 29 and the ECU of the power train system via the communication system such as the CAN 12. As a result, the vehicle 1 can be decelerated or accelerated while the deceleration request Fdreq or the acceleration request Fareq is satisfied by the electric brake mechanism(s) 5 and/or 6 of the normal wheel (the right front wheel 3R, the right rear wheel 4R, and/or the left rear wheel 4L) and the power train system. In this case, the first ECU 10 may output (transmit) the "acceleration/deceleration torque (the accelerator torque or the brake torque)" to the ECU of the power train system via the superior vehicle control ECU.

The "brake torque (the deceleration torque)" of the power train system is output when the deceleration request Fdreq is greater than the sum of the braking forces generated by the electric brake mechanisms 5 and 6 (including the braking force of the failure wheel). The "accelerator torque (the acceleration torque)" of the power train system is output when the deceleration request Fdreq is smaller than the sum of the braking forces generated by the electric brake mechanisms 5 and 6 (including the braking force of the failure wheel), or when the acceleration/deceleration request is the acceleration request Fareq. After the instructions (the requests) for the "braking force" and "acceleration/deceleration torque (the accelerator torque or the brake torque)" are output in S7, the processing returns.

FIG. 5 illustrates the relationship among the magnitude of the first braking force, the magnitude of the second braking force, and the magnitude of the acceleration/deceleration request. In the embodiment, the "magnitude of the second braking force" is adjusted according to the "acceleration/deceleration request (the acceleration request or the deceleration request)" and the "magnitude of the first braking force" in the following manner. FIG. 5 illustrates the "magnitude of the second braking force" using a stippled pattern. For example, as indicated in (A) in FIG. 5, when the magnitude of the deceleration request is twice the magnitude of the first braking force, the second braking force is set to the same magnitude as the first braking force. For example, as indicated in (B) in FIG. 5, when the magnitude of the deceleration request is less than twice the magnitude of the first braking force and falls within the predetermined amount range (±ΔF), the second braking force is set to smaller magnitude than the magnitude of the first braking force within the predetermined amount range (±ΔF). For example, as indicated in (C) in FIG. 5, when the magnitude of the deceleration request is more than twice the magnitude of the first braking force and falls within the predetermined amount range (±ΔF), the second braking force is set to greater magnitude than the magnitude of the first braking force within the predetermined amount range (±ΔF).

For example, as indicated in (D) in FIG. 5, when the magnitude of the deceleration request is more than twice the magnitude of the first braking force, the second braking force is set to magnitude greater than the first braking force by the predetermined amount ΔF. Then, a deceleration force (a deceleration torque) corresponding to the difference between the "magnitude of the deceleration request" and the "sum of the magnitude of the first braking force and the magnitude of the second braking force" is generated by the power train system (PT). For example, as indicated in (E) in FIG. 5, when the magnitude of the deceleration request is less than twice the magnitude of the first braking force and is less than the predetermined amount range (±ΔF), the second braking force is set to magnitude smaller than the first braking force by the predetermined amount ΔF. Then, an acceleration force (an acceleration torque) corresponding to the difference between the "sum of the magnitude of the first braking force and the magnitude of the second braking force" and the "magnitude of the deceleration request" is generated by the power train system (PT). For example, as indicated in (F) in FIG. 5, in the case of the acceleration request, the second braking force is set to magnitude smaller than the first braking force by the predetermined amount ΔF. Then, an acceleration force (an acceleration torque) corresponding to the sum of the "sum of the magnitude of the first braking force and the magnitude of the second braking force" and the "magnitude of the acceleration request" is generated by the power train system (PT).

In this manner, according to the embodiment, the vehicle 1 includes a first frictional braking apparatus (for example, the left front electric brake mechanism 5L) configured to provide a braking force to a first wheel (for example, the left front wheel 3L), which is one of the left and right wheels of the vehicle 1, and a second frictional braking apparatus (for example, the right front electric brake mechanism 5R and/or the right rear electric brake mechanism 6R) configured to provide a braking force to a second wheel portion (for example, the right front wheel 3R and/or the right rear wheel 4R), which is the other wheel portion of the left and right wheels. Further, the vehicle 1 includes the ECU(s) 10 and/or 11 as the vehicle control apparatus and the control unit configured to control the first frictional braking apparatus (for example, the left front electric brake mechanism 5L) and the second frictional braking apparatus (for example, the right front electric brake mechanism 5R and/or the right rear electric brake mechanism 6R).

The ECU(s) 10 and/or 11 include(s) the control portion(s) 10A and/or 11A configured to control the first frictional braking apparatus (for example, the left front electric brake mechanism 5L) and the second frictional braking apparatus (for example, the right front electric brake mechanism 5R and/or the right rear electric brake mechanism 6R). The first frictional braking apparatus (for example, the left front electric brake mechanism 5L), the second frictional braking apparatus (for example, the right front electric brake mechanism 5R and/or the right rear electric brake mechanism 6R), and the EC U(s) 10 and/or 11 form the vehicle control system.

Now, the "left wheel" of the vehicle 1 corresponds to the left front wheel 3L or the left rear wheel 4L, and the "left wheel portion" of the vehicle 1 corresponds to the left front wheel 3L and the left rear wheel 4L. Further, the "right wheel" of the vehicle 1 corresponds to the right front wheel 3R or the right rear wheel 4R, and the "right wheel portion" of the vehicle 1 corresponds to the right front wheel 3R and the right rear wheel 4R. Then, in the case where the first wheel, which is the one wheel of the left and right wheels of the vehicle 1, is the left wheel (the left front wheel 3L or the left rear wheel 4L), the second wheel, which is the other wheel, is the right wheel (the right front wheel 3R or the right rear wheel 4R), and the second wheel portion, which is the other wheel portion, is the right wheel portion (the right front wheel 3R and the right rear wheel 4R). On the other hand, in the case where the first wheel, which is the one wheel of the left and right wheels of the vehicle 1, is the right wheel (the right front wheel 3R or the right rear wheel 4R), the second wheel, which is the other wheel, is the left wheel (the left front wheel 3L or the left rear wheel 4L), and the second wheel portion, which is the other wheel portion, is the left wheel portion (the left front wheel 3L and the left rear wheel 4L).

When the first braking force provided to the first wheel (for example, the left front wheel 3L) cannot be controlled due to a failure in the first frictional braking apparatus (for example, the left front electric brake mechanism 5L), the ECU(s) 10 and/or 11 (the control portion(s) 10A and/or 11A) output(s) the braking instruction for causing the second frictional braking apparatus (for example, the right front electric brake mechanism 5R and/or the right rear electric brake mechanism 6R) to generate the second braking force according to the magnitude of the first braking force. In this case, the braking instruction can be output to, for example, the electric brake ECUs 29 of the second frictional braking apparatus (for example, the right front electric brake mechanism 5R and/or the right rear electric brake mechanism 6R).

For example, as indicated in (A) in FIG. 5, the ECU(s) 10 and/or 11 (the control portion(s) 10A and/or 11A) output(s) the braking instruction in such a manner that the magnitude of the second braking force matches the magnitude of the first braking force. Alternatively, the ECU(s) 10 and/or 11 (the control portion(s) 10A and/or 11A) determine(s) the second braking force according to the estimated moment amount to be generated by the steering apparatus (the steering system) of the vehicle 1. In this case, for example, as indicated in (B) in FIG. 5, the ECU(s) 10 and/or 1I (the control portion(s) 10A and/or 11A) can output the braking force in such a manner that the magnitude of the second braking force is smaller than the magnitude of the first braking force by the predetermined amount ΔF. Alternatively, for example, as indicated in (C) in FIG. 5, the ECU(s) 10 and/or 11 (the control portion(s) 10A and/or 11A) can output the braking force in such a manner that the magnitude of the second braking force is greater than the magnitude of the first braking force by the predetermined amount ΔF.

Further, the ECU(s) 10 and/or 11 (the control portion(s) 10A and/or 11A) output(s) the acceleration/deceleration instruction according to the relationship between the "magnitude of the first braking force" and the "magnitude of the acceleration/deceleration request requested to the vehicle 1". The "acceleration/deceleration request" corresponds to, for example, the acceleration/deceleration request (the acceleration request or the deceleration request) from the driver or the acceleration/deceleration request (the acceleration request or the deceleration request) from the autonomous driving system. The "acceleration/deceleration instruction" can be output to, for example, the ECU of the power train system. Alternatively, the "acceleration/deceleration instruction" can be output to, for example, the electric brake ECU 29 of a third frictional braking apparatus (for example, the left rear electric brake mechanism 6L) configured to provide a braking force to a third wheel (for example, the left rear wheel 4L), which is a wheel that is located on the same side in the lateral direction of the vehicle 1 as the first wheel (for example, the left front wheel 3L) and is a different wheel from the first wheel.

For example, as indicated in (D) in FIG. 5, when the acceleration/deceleration request is a deceleration request and the magnitude of the deceleration request is more than twice the magnitude of the first braking force, the ECU(s) 10 and/or 11 (the control portion(s) 10A and/or 11A) output(s) the braking instruction in such a manner that the magnitude of the second braking force is greater than the magnitude of the first braking force by the predetermined amount ΔF. Along therewith, the ECU(s) 10 and/or 11 (the control portion(s) 10A and/or 11A) output(s) the deceleration instruction of the acceleration/deceleration instruction so as to generate a deceleration corresponding to the difference between the "magnitude of the deceleration request" and the "sum of the magnitude of the first braking force and the magnitude of the second braking force".

On the other hand, for example, as indicated in (E) in FIG. 5, when the acceleration/deceleration request is a deceleration request and the magnitude of the deceleration request is less than twice the magnitude of the first braking force, the ECU(s) 10 and/or 11 (the control portion(s) 10A and/or 11A) output(s) the braking instruction in such a manner that the magnitude of the second braking force is smaller than the magnitude of the first braking force by the predetermined amount ΔF. Along therewith, the ECU(s) 10 and/or 11 (the control portion(s) 10A and/or 11A) output(s) the acceleration instruction of the acceleration/deceleration instruction so as to generate a deceleration corresponding to the difference between the "sum of the magnitude of the first braking force and the magnitude of the second braking force" and the "magnitude of the deceleration request".

Alternatively, for example, as indicated in (F) in FIG. 5, when the acceleration/deceleration request is an acceleration request, the ECU(s) 10 and/or 11 (the control portion(s) 10A and/or 11A) output(s) the braking force in such a manner that the magnitude of the second braking force is smaller than the magnitude of the first braking force by the predetermined amount ΔF. Along therewith, the ECU(s) 10 and/or 11 (the control portion(s) 10A and/or 11A) output(s) the acceleration instruction of the acceleration/deceleration instruction so as to generate an acceleration corresponding to the sum of the "sum of the magnitude of the first braking force and the magnitude of the second braking force" and the "magnitude of the acceleration request".

Further, in the embodiment, the first frictional braking apparatus (for example, the left front electric brake mechanism 5L) and the second frictional braking apparatus (for example, the right front electric brake mechanism 5R and/or the right rear electric brake mechanism 6R) are each an electric brake mechanism actuated by the electric motor 23. More specifically, the first frictional braking apparatus is actuated by a first electric motor (for example, the electric motor 23 of the left front electric brake mechanism 5L). The second frictional braking apparatus is actuated by a second electric motor (for example, the electric motor 23 of the right front electric brake mechanism 5R and/or the electric motor 23 of the right rear electric brake mechanism 6R).

Now, the embodiment has been described mainly focusing on the example in which the left front wheel 3L is assumed to be the failure wheel and the second braking force is generated by the right front electric brake mechanism 5R of the right front wheel 3R laterally opposite from this failure wheel. However, the second braking force is not limited thereto. For example, assuming that the left front wheel 3L is the failure wheel, the second braking force may be generated by the right rear electric brake mechanism 6R of the right rear wheel 4R laterally opposite (more specifically, located on a diagonal side) from this failure wheel. In other words, the second wheel portion can also be a second front wheel, which is a front wheel in the other wheel portion (for example, the right front wheel 3R), or a second rear wheel, which is a rear wheel in the other wheel portion (for example, the right rear wheel 4R). The same also applies to when the left side and the right side are switched.

Further, the embodiment has been described mainly focusing on the example in which the left front wheel 3L is assumed to be the failure wheel and the second braking force is generated by the right front electric brake mechanism 5R of the right front wheel 3R laterally opposite from this failure wheel. However, the second braking force is not limited thereto. Assuming that the left front wheel 3L is the failure wheel, the second braking force may be generated by the right front electric brake mechanism 5R of the right front wheel 3R and the right rear electric brake mechanism 6R of the right rear wheel 4R laterally opposite from this failure wheel. In this case, the following configuration can be employed. That is, the second wheel portion includes the second front wheel, which is the front wheel in the other wheel portion (for example, the right front wheel 3R), and the second rear wheel, which is the rear wheel in the other wheel portion (for example, the right rear wheel 4R).

Then, the second frictional braking apparatus includes a second front wheel frictional braking apparatus (for example, the right front electric brake mechanism 5R) configured to provide a braking force to the second front wheel (for example, the right front wheel 3R), and a second rear wheel frictional braking apparatus (for example, the right rear electric brake mechanism 6R) configured to provide a braking force to the second rear wheel (for example, the right rear wheel 4R). In this case, the ECU(s) 10 and/or 11 (the control portion(s) 10A and/or 11A) output(s) the braking instruction in such a manner that the second braking force is generated while being distributed into a second front wheel braking force generated by the second front wheel frictional braking apparatus (for example, the right front electric brake mechanism 5R) and a second rear wheel braking force generated by the second rear wheel frictional braking apparatus (for example, the right rear electric brake mechanism 6R).

Next, the braking force distribution and the acceleration/deceleration request will be specifically described with reference to the time graphs illustrated in FIGS. 6 to 8.

Figure 6:
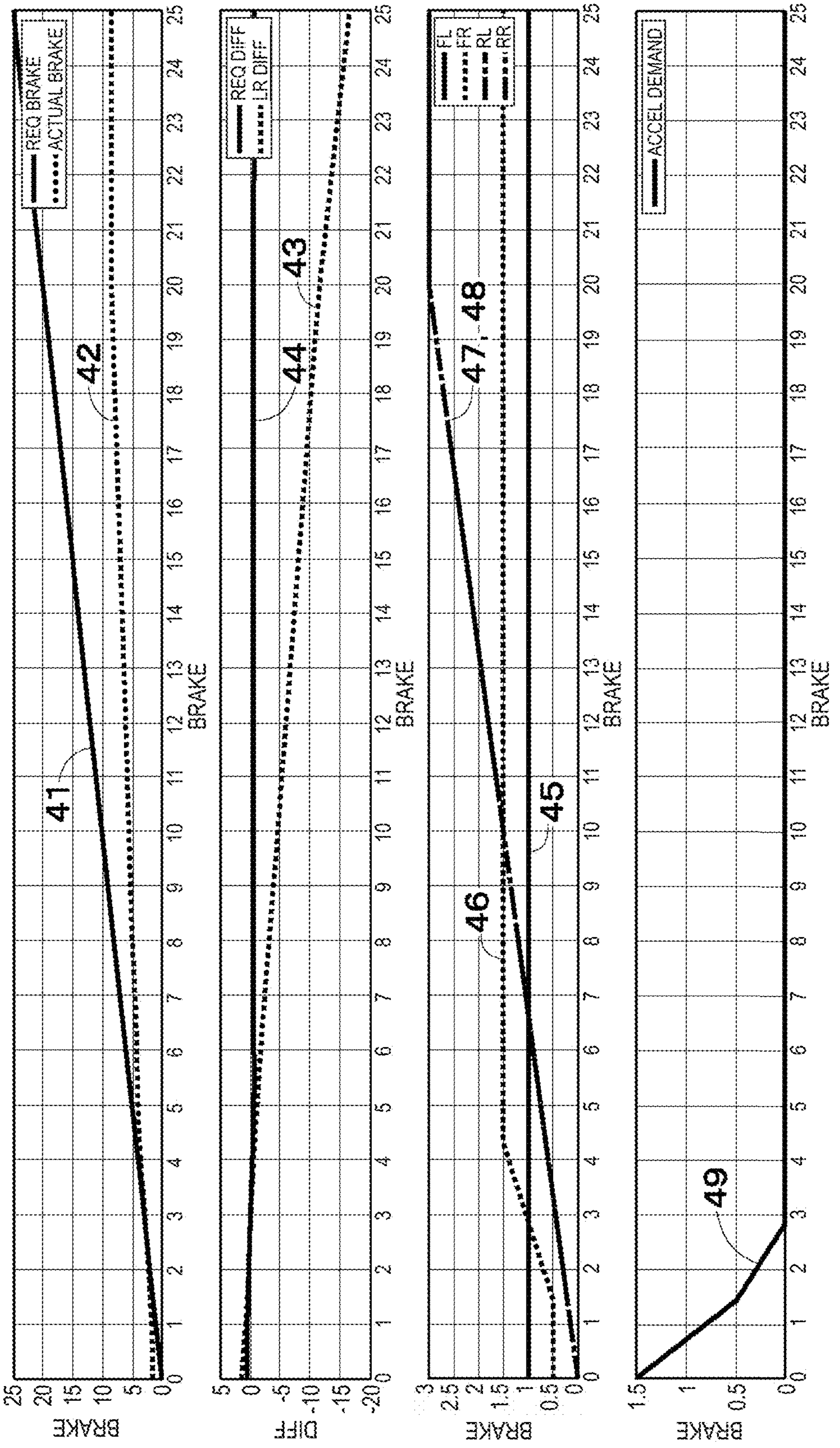

FIG. 6 illustrates time graphs indicating one example of time-series changes in the "acceleration/deceleration request (the deceleration request)", the "braking force of each wheel", the "acceleration/deceleration instruction (the deceleration instruction)", and the like. FIG. 6 illustrates an example in which a braking force of the "failure braking force t the predetermined amount range ΔF" is generated on a wheel located on the longitudinally same side as and the laterally opposite side from the failure wheel, and a braking force similar to the braking force under normal conditions is generated on the remaining two wheels. In other words, FIG. 6 illustrates an example in which, assuming that the left front wheel 3L is the failure wheel, a braking force of the failure braking force±the predetermined amount range ΔF is generated on the right front wheel 3R located on the longitudinally same side as and the laterally opposite side from this left front wheel 3L, and a braking force similar to the braking force under normal conditions is generated on the remaining two wheels. The failure braking force corresponds to the first braking force. The example illustrated in FIG. 6 is an example simply controllable but supposed to constantly allow a yaw moment equal to or smaller than the predetermined amount ΔF and fail to achieve the request for deceleration. When the predetermined amount ΔF≠0 is allowed, a yaw moment is basically generated due to the difference in braking force between the left side and the right side.

The preconditions of FIG. 6 are defined as follows.

(1) The deceleration request Fdreq corresponding to the requested braking force increases in 25 seconds as Fdreq=0 to 25.

(2) The failure braking force corresponding to the first braking force is Fs=1.

(3) The predetermined amount ΔF=0.5.

(4) The failure wheel=the left front wheel 3L.

(5) The wheel where the second braking force is generated=the right front wheel 3R.

(6) The proportion of a front wheel braking force Frratio=0.7.

(7) The proportion of a rear wheel braking force Rrratio=0.3.

Assume that the braking forces FL, FR, RL, and RR of the respective wheels (the left front wheel 3L, the right front wheel 3R, the left rear wheel 4L, and the right rear wheel 4R) under normal conditions are calculated according to the following equation 1 when Fdreq represents the deceleration request.

$$FL = Fdreq/2 \times F\,rratio \qquad \text{[Equation 1]}$$

$$FR = Fdreq/2 \times Frratio$$

$$RL = Fdreq/2 \times Frratio$$

$$RR = Fdreq/2 \times Frratio$$

The first time graph from the top in FIG. 6 indicates the deceleration request Fdreq and the sum Factu of the braking forces realized on the respective wheels (=FL+FR+RL+RR). More specifically, a characteristic line 41 corresponds to the deceleration request Fdreq, and a characteristic line 42 corresponds to the sum Factu. The second time graph from the top in FIG. 6 indicates a difference Req Diff between the sum Factu of the braking forces realized on the respective wheels and the deceleration request Fdreq (=Factu−Fdreq), and a difference LR Diff in braking force between the left side and the right side (=(FL+RL)−(FR+RR)). More specifically, a characteristic line 43 corresponds to the difference Req Diff between the sum Factu and the deceleration request Fdreq, and a characteristic line 44 corresponds to the difference LR Diff in braking force between the left side and the right side.

The third time graph from the top in FIG. 6 indicates the braking forces FL, FR, RL, and RR of the respective wheels. More specifically, a characteristic line 45 corresponds to the braking force FL=Fs (=1) of the left front wheel 3L, a characteristic line 46 corresponds to the braking force FR of the right front wheel 3R, a characteristic line 47 corresponds to the braking force RL of the left rear wheel 4L, and a characteristic line 48 corresponds to the braking force RR of the right rear wheel 4R. The fourth time graph from the top in FIG. 6 indicates an acceleration instruction Fareq' corresponding to the difference between the deceleration request Fdreq and the sum Factu of the braking forces realized on the respective wheels (Factu−Fdreq). More specifically, a characteristic line 49 corresponds to the acceleration instruction Fareq'.

As indicated in the third time graph from the top in FIG. 6, the braking force of FL=Fs (=1) is generated on the left front wheel 3L, which is the wheel where the first braking force Fs is generated. The braking force FR is generated under conditions expressed by the following equation 2 on the right front wheel 3R, which is the wheel where the second braking force is generated.

$$FR = Fs - \Delta F \ [Fdreq/2 \times Frratio < Fs - \Delta F] \qquad \text{[Equation 2]}$$

$$FR = Fdreq/2 \times Frratio \ [Fs - \Delta F \leqq Fdreq/2 \times Frratio \leqq Fs + \Delta F]$$

$$FR = Fs - \Delta F \ [Fs + \Delta F < Fdreq/2 \times Frratio]$$

The braking forces RL and RR according to the following equation 3 are generated on the left rear wheel 4L and the right rear wheel 4R without being changed from those under normal conditions.

$$RL = Fdreq/2 \times Rrratio \qquad \text{[Equation 3]}$$

$$RR = Fdreq/2 \times Rrratio$$

When the braking forces RL and RR generated on the left rear wheel 4L and the right rear wheel 4R increase as the deceleration request increases, the slip amount of the wheel increases and the tire is locked according to the relationship between a change in the load imposed on each wheel along with the deceleration and the frictional coefficient between the tire and the road surface. To avoid that, brake control for preventing the tire from being locked, such as EBD (Electronic Brakeforce Distribution) or ABS, intervenes. This prohibits the braking force of each wheel from increasing more than some value. The braking force realized on the wheel laterally opposite from the failure wheel should match the braking force generated on the failure wheel, but allowing the predetermined amount ΔF>0 makes it possible to achieve a further greater deceleration request.

The acceleration instruction Fareq' is calculated as expressed by the following equation 4 by adding the deceleration request Fdreq and the sum Factu of the braking forces realized on the respective wheels to the original acceleration request Fareq.

$$F\,areq' = Fareq \ [F\,actu \leqq F\,dreq] \qquad \text{[Equation 4]}$$

$$F\,areq' = Fareq + (F\,actu - Fdreq) \ [F\,actu > Fdreq]$$

For example, the superior vehicle control ECU outputs the "original acceleration request Fareq" to the ECU of the power train system. The ECU(s) 10 and/11 output(s) the "sum Factu of the braking forces−the deceleration request Fdreq" to the vehicle control ECU. The vehicle control ECU outputs the "acceleration instruction Fareq" acquired by adding the "sum Factu of the braking forces−the deceleration request Fdreq" to the "original acceleration request Fareq" to the ECU of the power train system. The "deceleration request Fdreq" is known to the vehicle control ECU, and therefore the ECU(s) 10 and/or 11 may output the "sum Factu of the braking forces" to the vehicle control ECU and the vehicle control ECU may calculate the "sum Factu of the braking forces−the deceleration request Fdreq". Further, the "sum Factu of the braking forces−the deceleration request Fdreq" may be output from the vehicle control ECU to the ECU of the power train system, and the ECU of the power train system may calculate the "acceleration instruction Fareq" by adding the "sum Factu of the braking forces−the deceleration request Fdreq" to the "original acceleration request Fareq". The vehicle control ECU outputs the "deceleration request Fdreq" to the ECU(s) 10 and/or 11.

Figure 7:
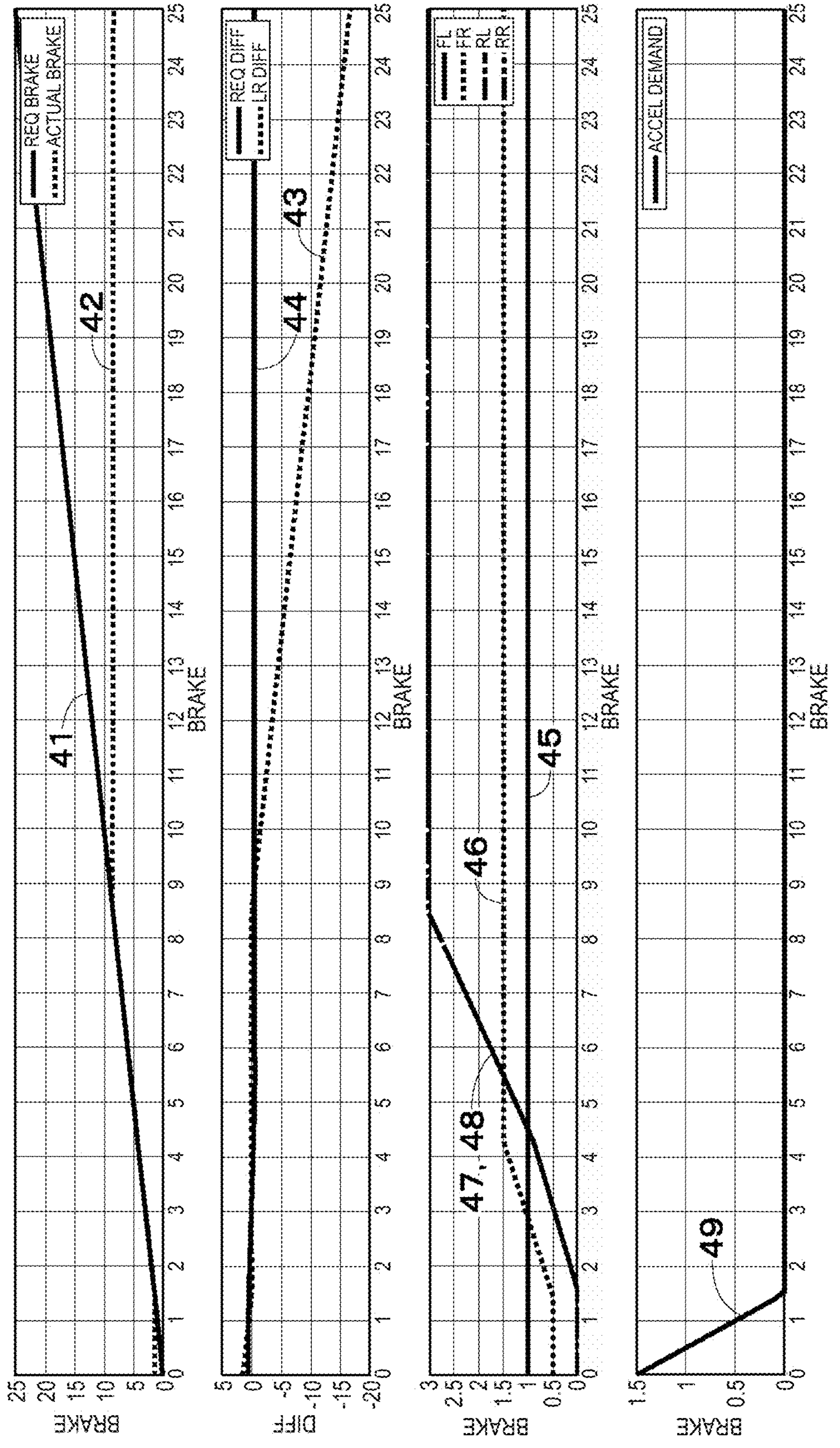

Next, FIG. 7 illustrates time graphs indicating another example (first another example) of the time-series changes in the "acceleration/deceleration request (the deceleration request)", the "braking force of each wheel", the "acceleration/deceleration instruction (the deceleration instruction)", and the like. FIG. 7 illustrates an example in which a braking force of the "failure braking force±the predetermined amount range ΔF" is generated on a wheel located on the longitudinally same side as and the laterally opposite side from the failure wheel, and an insufficient braking force is generated on the remaining two wheels while being evenly distributed to the left side and the right side. In other words, FIG. 7 illustrates an example in which, assuming that the left front wheel 3L is the failure wheel, a braking force of the failure braking force±the predetermined amount range ΔF is generated on the right front wheel 3R located on the longitudinally same side as and the laterally opposite side from this left front wheel 3L, and an insufficient braking force is generated on the remaining two wheels while being evenly distributed to the left side and the right side. The example illustrated in FIG. 7 is an example in which the deceleration request can be achieved as closely as possible, but a yaw moment is basically generated due to the difference in braking force between the left side and the right side when the predetermined amount ΔF≠0 is allowed.

The preconditions of FIG. 7 are similar to the preconditions of FIG. 6. Further, the braking forces FL, FR, RL, and RR of the respective wheels (the left front wheel 3L, the right front wheel 3R, the left rear wheel 4L, and the right rear wheel 4R) under normal conditions are also calculated according to an equation similar to the equation for FIG. 6 (the equation 1). Further, the reference numerals of characteristic lines in the respective time graphs in FIG. 7 are also defined in a similar manner to those in FIG. 6.

As indicated in the third time graph from the top in FIG. 7, the braking force of FL=Fs (=1) is generated on the left front wheel 3L, which is the wheel where the first braking force Fs is generated. The braking force FR is generated under the conditions expressed by the above-described equation 2 on the right front wheel 3R, which is the wheel where the second braking force is generated, similarly to the braking force FR in FIG. 6. The insufficient braking force is evenly distributed to the left rear wheel 4L and the right rear wheel 4R, and the braking forces RL and RR according to the following equation 5 are generated thereon. Assume that the calculation is made first for the wheel located on the longitudinally same side as and the laterally opposite side from the failure wheel. The acceleration instruction Fareq' is calculated according to the above-described equation 4 similarly to the acceleration instruction Fareq' in FIG. 6.

[Equation 5]

$$RL = 0 \ [(F\,dreq - Fs - FR)/2 \leqq 0]$$

$$RL = (F\,dreq - Fs - FR)/2 \ [0 < (F\,dreq - Fs - FR)/2]$$

$$RR = 0 \ [(F\,dreq - Fs - FR)/2 \leqq 0]$$

$$RR = (F\,dreq - Fs - FR)/2 \ [Fs \times 2 - \Delta F < Fdreq]$$

Figure 8:
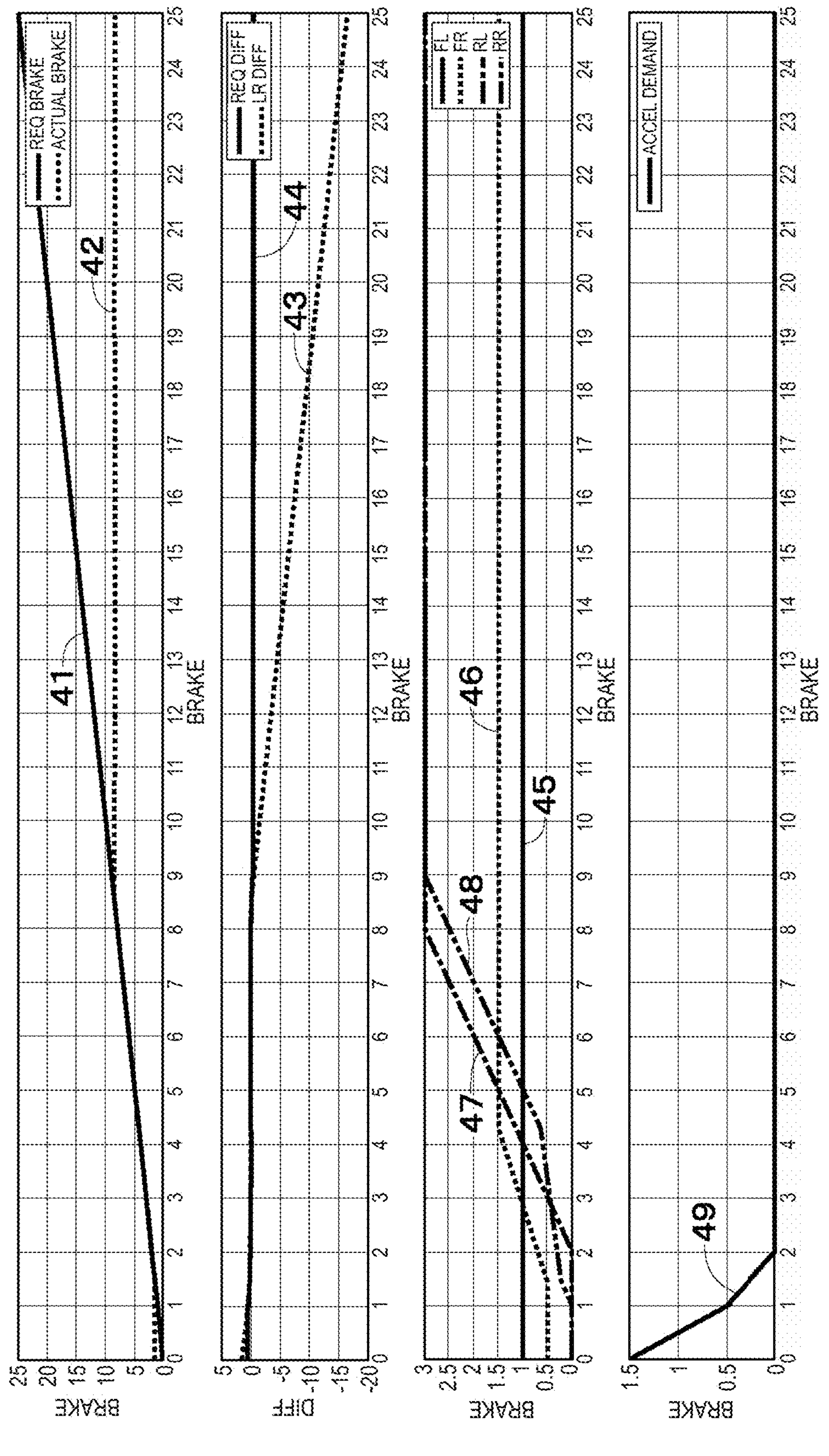

Next, FIG. 8 illustrates time graphs indicating another example (second another example) of the time-series changes in the "acceleration/deceleration request (the deceleration request)", the "braking force of each wheel", the "acceleration/deceleration instruction (the deceleration instruction)", and the like. FIG. 8 illustrates an example in which a braking force of the "failure braking force±the predetermined amount range ΔF" is generated on a wheel located on the longitudinally same side as and the laterally opposite side from the failure wheel, and an insufficient braking force is generated on the remaining two wheels while being distributed so as to eliminate the difference in braking force between the left side and the right side. In other words, FIG. 8 illustrates an example in which, assuming that the left front wheel 3L is the failure wheel, a braking force of the failure braking force±the predetermined amount range ΔF is generated on the right front wheel 3R located on the longitudinally same side as and the laterally opposite side from this left front wheel 3L, and an insufficient braking force is generated on the remaining two wheels while being distributed so as to eliminate the difference in braking force between the left side and the right side. In the example illustrated in FIG. 8, the deceleration request can be achieved as closely as possible, and a yaw moment (the difference in braking force between the left side and the right side) can be suppressed as much as possible when the predetermined amount ΔF≠0 is allowed.

The preconditions of FIG. 8 are similar to the preconditions of FIG. 6. Further, the braking forces FL, FR. RL, and RR of the respective wheels (the left front wheel 3L, the right front wheel 3R, the left rear wheel 4L, and the right rear wheel 4R) under normal conditions are also calculated according to an equation similar to the equation for FIG. 6 (the equation 1). Further, the reference numerals of characteristic lines in the respective time graphs in FIG. 8 are also defined in a similar manner to those in FIG. 6.

As indicated in the third time graph from the top in FIG. 8, the braking force of FL=Fs (=1) is generated on the left front wheel 3L, which is the wheel where the first braking force Fs is generated. The braking force FR is generated under the conditions expressed by the above-described equation 2 on the right front wheel 3R, which is the wheel where the second braking force is generated, similarly to the braking force FR in FIG. 6. The insufficient braking force is distributed to the left rear wheel 4L and the right rear wheel 4R so as to eliminate the difference in braking force between the left side and the right side, and the braking forces RL and RR according to the following equation 6 are generated thereon. Assume that the calculation is made first for the wheel located on the longitudinally same side as and the laterally opposite side from the failure wheel. The acceleration instruction Fareq' is calculated according to the above-described equation 4 similarly to the acceleration instruction Fareq' in FIG. 6.

$$RL = 0 \; [(F\ dreq - Fs - FR)/2 + (FR - Fs)/2 \leqq 0] \qquad \text{[Equation 6]}$$

$$RL = (F\ dreq - Fs - FR)/2 + (FR - Fs)/2$$

$$[0 < (F\ dreq - Fs - FR)/2 + (FR - Fs)/2]$$

$$RR = 0 \; [(F\ dreq - Fs - FR)/2 - (FR - Fs)/2 \leqq 0]$$

$$RR = (F\ dreq - Fs - FR)/2 - (FR - Fs)/2$$

$$[0 < (F\ dreq - Fs - FR)/2 - (FR - Fs)/2]$$

In any case of FIGS. 6 to 8, the second braking force may be generated on the right rear wheel 4R, or may be generated on both the right front wheel 3R and the right rear wheel 4R while being distributed to them at, for example, 0.7:0.3. Further, in the case where the failure wheel is the right front wheel 3R, the braking forces can be calculated by exchanging the equation between the left wheel and the right wheel. In the case where the failure wheel is the left rear wheel 4L, the braking forces can be calculated by exchanging the equation between the front wheel and the rear wheel. In the case where the failure wheel is the right rear wheel 4R, the braking forces can be calculated by exchanging the equation between the left and right wheels and the front and rear wheels.

Further, in the time graphs in FIG. 6, for example, the difference between the "deceleration request Fdreq" and the "sum Factu of the actual braking forces" is increasing from approximately 4 seconds. Further, in the time graphs in FIGS. 7 and 8, for example, the difference between the "deceleration request Fdreq" and the "sum Factu of the actual braking forces" is increasing from approximately 8.5 seconds. Actually, it is considered that, when a failure has occurred, a degradation mode such as limiting the speed or the braking force is set, and/or the driver is notified of information prompting the driver to stop the vehicle (notified by, for example, issuing a warning, a warning sound, or a warning voice, and/or lighting up or blinking a lamp).

Further, for example, a deceleration instruction corresponding to the difference between the "deceleration request Fdreq" and the "sum Factu of the actual braking forces" can also be output to the power train system. On the other hand, even if the deceleration instruction is not output to the power train system, the vehicle behavior can be stabilized for, for example, approximately 8.5 seconds since the moment that the failure has occurred. In other words, the control performed for approximately 8.5 seconds since 0 in the time graphs illustrated in FIGS. 6 to 8 allows the behavior of the vehicle 1 to be stabilized since the moment that the failure has occurred until the vehicle is safely stopped.

In this manner, according to the embodiment, the ECU(s) 10 and/or 11 (the control portion(s) 10A and/or 11A) output(s) the braking instruction for causing the second frictional braking apparatus (for example, the right front electric brake mechanism 5R and/or the right rear electric brake mechanism 6R) to generate the second braking force according to the magnitude of the first braking force, when the first braking force (the failure braking force) cannot be controlled due to a failure in the first frictional braking apparatus (for example, the left front electric brake mechanism 5L). Due to that, the second frictional braking apparatus (for example, the right front electric brake mechanism 5R and/or the right rear electric brake mechanism 6R) can generate the second braking force according to the magnitude of the first braking force, i.e., the second braking force controlled so as to allow the vehicle 1 to maintain the stable behavior. As a result, the behavior of the vehicle 1 can be prevented from losing stability under the unintended braking force generated due to a failure in the frictional braking apparatus (for example, the left front electric brake mechanism 5L).

According to the embodiment, the ECU(s) 10 and/or 11 (the control portion(s) 10A and/or 11A) output(s) the acceleration/deceleration instruction according to the relationship between the "magnitude of the first braking force" and the "magnitude of the acceleration/deceleration request requested to the vehicle 1". Therefore, the acceleration/deceleration instruction can be output for generating the acceleration/deceleration corresponding to the acceleration/deceleration request requested to the vehicle 1 with the first braking force and the second braking force provided thereto. As a result, the acceleration/deceleration can be generated in correspondence with the acceleration/deceleration request while the behavior of the vehicle 1 is prevented from losing stability.

According to the embodiment, as indicated in (F) in FIG. 5, when the acceleration/deceleration request is an acceleration request, the ECU(s) 10 and/or 11 (the control portion(s) 10A and/or 11A) output(s) the braking force in such a manner that the magnitude of the second braking force is smaller than the magnitude of the first braking force by the predetermined amount ΔF. Along therewith, the ECU(s) 10 and/or 11 (the control portion(s) 10A and/or 11A) output(s) the acceleration instruction so as to generate the acceleration corresponding to the sum of the "sum of the magnitude of the first braking force and the magnitude of the second braking force" and the "magnitude of the acceleration request". As a result, the acceleration can be generated in correspondence with the acceleration request with the acceleration force (the acceleration torque) reduced as much as the reduction in the magnitude of the second braking force that falls below the magnitude of the first braking force by the predetermined amount ΔF.

According to the embodiment, as indicated in (E) in FIG. 5, when the acceleration/deceleration request is a deceleration request and the magnitude of the deceleration request is less than twice the magnitude of the first braking force, the ECU(s) 10 and/or 11 (the control portion(s) 10A and/or 11A) output(s) the braking instruction in such a manner that the magnitude of the second braking force is smaller than the magnitude of the first braking force by the predetermined amount ΔF. Along therewith, the ECU(s) 10 and/or 11 (the control portion(s) 10A and/or 11A) output(s) the acceleration instruction so as to generate the deceleration corresponding to the difference between the "sum of the magnitude of the first braking force and the magnitude of the second braking force" and the "magnitude of the deceleration request". As a result, the deceleration can be generated in correspondence with the deceleration request with the acceleration force (the acceleration torque) reduced as much as the reduction in the magnitude of the second braking force that falls below the magnitude of the first braking force by the predetermined amount ΔF. In addition, the addition of the acceleration force (the acceleration torque) allows the deceleration to be generated in correspondence with the deceleration request smaller than the "sum of the magnitude of the first braking force and the magnitude of the second braking force" even with the first braking force and the second braking force provided.

According to the embodiment, as indicated in (D) in FIG. 5, when the acceleration/deceleration request is a deceleration request and the magnitude of the deceleration request is more than twice the magnitude of the first braking force, the ECU(s) 10 and/or 11 (the control portion(s) 10A and/or 11A)

output(s) the braking instruction in such a manner that the magnitude of the second braking force is greater than the magnitude of the first braking force by the predetermined amount ΔF. Along therewith, the ECU(s) 10 and/or 11 (the control portion(s) 10A and/or 11A) output(s) the deceleration instruction so as to generate the deceleration corresponding to the difference between the "magnitude of the deceleration request" and the "sum of the magnitude of the first braking force and the magnitude of the second braking force". Therefore, the addition of the deceleration force (the deceleration torque) allows the deceleration to be generated in correspondence with the deceleration request greater than the "sum of the magnitude of the first braking force and the magnitude of the second braking force".

According to the embodiment, as indicated in (A) in FIG. 5, the ECU(s) 10 and/or 11 (the control portion(s) 10A and/or 11A) output(s) the braking instruction in such a manner that the magnitude of the second braking force matches the magnitude of the first braking force. As a result, the braking force can be consistent between the left side and the right side of the vehicle 1, and this can suppress the generation of a yaw moment on the vehicle 1 derived from the difference between the second braking force and the first braking force.

According to the embodiment, the ECU(s) 10 and/or 11 (the control portion(s) 10A and/or 11A) determine(s) the second braking force according to the estimated moment amount to be generated by the steering apparatus (the steering system) of the vehicle 1 by the processing in S3. S4, and S5 in FIG. 3. Therefore, the yaw moment derived from the difference between the second braking force and the first braking force can be reduced with the aid of the yaw moment generated by the steering apparatus (the steering system) of the vehicle 1. In other words, the yaw moment derived from the difference between the second braking force and the first braking force can be reduced (canceled) by the yaw moment generated by the steering apparatus (the steering system) of the vehicle 1. Due to that, for example, even when a difference is generated between the magnitude of the second braking force and the magnitude of the first braking force, the generation of a yaw moment can be suppressed by cooperating with the steering apparatus (the steering system) of the vehicle 1. In other words, even when the difference increases between the second braking force and the first braking force, the yaw moment of the vehicle 1 can be reduced with the aid of the moment generated by the steering apparatus of the vehicle. At this time, the acceleration/deceleration instruction can be increased/reduced according to the increase/reduction in the second braking force.

According to the embodiment, the first frictional braking apparatus (for example, the left front electric brake mechanism 5L) is actuated by the first electric motor (for example, the electric motor 23 of the left front electric brake mechanism 5L), and the second frictional braking apparatus (for example, the right front electric brake mechanism 5R and/or the right rear electric brake mechanism 6R) is actuated by the second electric motor (for example, the electric motor 23 of the right front electric brake mechanism 5R and/or the electric motor 23 of the right rear electric brake mechanism 6R). Therefore, even when the first braking force provided to the first wheel (for example, the left right wheel 3L) cannot be controlled due to a failure in the first frictional braking apparatus actuated by the first electric motor, the second braking force can be generated by the second frictional braking apparatus actuated by the second electric motor. Due to that, for example, even when the braking force becomes unable to be released by the first frictional braking mechanism actuated by the first electric motor, the behavior of the vehicle 1 can be prevented from losing stability. For example, in a case where the first frictional braking apparatus is configured not to have the function of separating the friction member (the brake pads 27) from the friction receiving member (the disk rotor D) when the first electric motor becomes unable to be driven, the behavior of the vehicle 1 can be prevented from losing stability when the first electric motor becomes unable to be driven.

According to the embodiment, the second wheel portion, which is the wheel portion on the normal side, is the second front wheel, which is the front wheel in the other (for example, right) wheel portion (for example, the right front wheel 3R), or the second rear wheel, which is the rear wheel in the other wheel portion (for example, the right rear wheel 4R). Due to that, the second braking force can be provided to the second front wheel (for example, the right front wheel 3R) or the second rear wheel (for example, the right rear wheel 4R) by the second frictional braking apparatus (for example, the right front electric brake mechanism 5R or the right rear electric brake mechanism 6R).

According to the embodiment, the second wheel portion, which is the wheel portion on the normal side, includes the second front wheel (for example, the right front wheel 3R) and the second rear wheel (for example, the right rear wheel 4R), and the second frictional braking apparatus includes the second front wheel frictional braking apparatus (for example, the right front electric brake mechanism 5R) configured to provide a braking force to the second front wheel (for example, the right front wheel 3R) and the second rear wheel frictional braking apparatus (for example, the right rear electric brake mechanism 6R) configured to provide a braking force to the second rear wheel (for example, the right rear wheel 4R). In addition thereto, the ECU(s) 10 and/or 11 (the control portion(s) 10A and/or 11A) output(s) the braking instruction in such a manner that the second braking force is generated while being distributed into the "second front wheel braking force generated by the second front wheel frictional braking apparatus (for example, the right front electric brake mechanism 5R)" and the "second rear wheel braking force generated by the second rear wheel frictional braking apparatus (for example, the right rear electric brake mechanism 6R)". Due to that, the second braking force (the second front wheel braking force and the second rear wheel braking force) can be provided while being distributed to the second front wheel (for example, the right front wheel 3R) and the second rear wheel (for example, the right rear wheel 4R) by the second front wheel frictional braking apparatus (for example, the right front electric brake mechanism 5R) and the second rear wheel frictional braking apparatus (for example, the right rear electric brake mechanism 6R).

The embodiment has been described citing the example in which the braking instruction is output in such a manner that, for example, the magnitude of the second braking force matches the magnitude of the first braking force when the magnitude of the deceleration request is twice the magnitude of the first braking force as indicated in, for example, (A) in FIG. 5. However, without being limited thereto, the vehicle control apparatus/method/system may, for example, output the braking instruction in such a manner that the magnitude of the second braking force is "smaller by the predetermined amount" or "greater by the predetermined amount" than the magnitude of the first braking force and output the acceleration/deceleration instruction (the acceleration instruction or the deceleration instruction) so as to cancel (offset) the predetermined amount even when the magnitude of the deceleration request is twice the magnitude of the first braking force.

The embodiment has been described citing the example in which the ECU(s) 10 and/or 11 (the control portion(s) 10A and/or 11A) output(s) the braking instruction for generating the second braking force to the electric brake ECUs 29. Further, the embodiment has been described citing the example in which the ECU(s) 10 and/or 11 (the control portion(s) 10A and/or 11A) output(s) the acceleration/deceleration instruction to the ECU of the power train system and/or the electric brake ECUs 29. However, without being limited thereto, the ECU(s) 10 and/or 11 (the control portion(s) 10A and/or 11A) may be configured to output the braking instruction and the acceleration/deceleration instruction to an ECU other than the electric brake ECU and the ECU of the power train system, such as an ECU that comprehensively controls the vehicle (for example, the superior vehicle control ECU). In other words, the braking instruction and the acceleration/deceleration instruction can be output to a destination to which the braking instruction and the acceleration/deceleration instruction should be output according to the specifications of the vehicle (for example, an ECU to which they should be output).

The embodiment has been described citing the example in which the front left electric brake mechanism 5L and the right rear electric brake mechanism 6R are controlled by the control portion 10A of the first ECU 10, and the right front electric brake mechanism 5R and the left rear electric brake mechanism 6L are controlled by the control portion 11A of the second ECU 11. However, without being limited thereto, the vehicle 1 may be configured in such a manner that, for example, the right front electric brake mechanism 5R and the left rear electric brake mechanism 6L are controlled by the control portion 10A of the first ECU 10, and the left front electric brake mechanism 5L and the right rear electric brake mechanism 6R are controlled by the control portion 11A of the second ECU 11. Alternatively, the four electric brake mechanisms 5L, 5R, 6L, and 5R may be controlled by any one ECU (control portion) of the first ECU 10 (the control portion 10A) and the second ECU 11 (the control portion 11A).

The embodiment has been described citing the example in which the first ECU 10 (the control portion 10A) and the second ECU 11 (the control portion 11A), and the electric brake ECUs 29 and 29 are configured to be separately provided. However, without being limited thereto, for example, the functions of the electric brake ECUs 29 and 29 may be included in the first ECU 10 (the control portion 10A) or the second ECU 11 (the control portion 11A).

The embodiment has been described citing the example in which each of the electric brake mechanisms 5 and 6 includes one brake mechanism 21. In other words, the embodiment has been described citing the example in which each of the electric brake mechanisms 5 and 6 is configured to include one electric motor 23. However, without being limited thereto, the electric brake mechanism may be configured to include, for example, two or more brake mechanisms (electric motors). In this case, the caliper of the brake mechanism may be, for example, shared by a plurality of pistons (pressing members) (for example, twin bores), or the electric brake mechanism may be configured to include a caliper for each piston (pressing member) and electric motor.

The embodiment has been described citing the example in which the brake mechanism 21 is a so-called floating caliper-type disk brake configured in such a manner that the piston 26 is provided on the inner side of the caliper 22. However, without being limited thereto, the brake mechanism may be, for example, a so-called opposed piston-type disk brake configured in such a manner that pistons are provided on the inner side and the outer side of the caliper, respectively.

The embodiment has been described citing the example in which the control portion that outputs the braking instruction and the acceleration/deceleration instruction is configured to be included in the first ECU 10 and/or the second ECU 11 serving as the ECU(s) for brake control. However, without being limited thereto, the control portion that outputs the braking instruction and the acceleration/deceleration instruction may be configured to be included in, for example, only any one of the first ECU 10 and the second ECU 11 (i.e., the first ECU 10 or the second ECU 11). Alternatively, the control portion that outputs the braking instruction and the acceleration/deceleration instruction may be configured to be included in, for example, the electric brake ECU 29.

Further, the control portion may be configured to be included in an ECU other than the ECU for brake control. In other words, the control portion may be configured to be included in at least any ECU mounted on the vehicle. In other words, the vehicle control apparatus (the control unit) that outputs the braking instruction and/or the acceleration/deceleration instruction may be the first ECU 10, may be the second ECU 11, may be the electric brake ECU 29, or may be another ECU. In sum, the function that outputs the braking instruction and/or the acceleration/deceleration instruction (the control portion) can be included in any ECU (the vehicle control apparatus or the control unit) mounted on the vehicle.

The embodiment has been described citing the example in which the electric brake mechanisms 5L, 5R, 6L, and 6R actuated by the electric motors 23 are employed as the frictional braking apparatus. However, without being limited thereto, the frictional braking apparatus may be a hydraulic brake mechanism (an oil pressure brake mechanism) actuated by a hydraulic pressure (a brake hydraulic pressure). For example, the hydraulic brake mechanism may be employed as the frictional braking apparatus on the front wheel side, or the hydraulic brake mechanism may be employed as the frictional braking apparatus of each of the four wheels. Further, the embodiment has been described citing the example in which the braking mechanism 21 is a disk brake. However, without being limited thereto, the brake mechanism may be constructed using various types of brake mechanisms such as a drum brake that presses a shoe (a frictional pad) against a drum rotor (a rotor) rotating together with a wheel.

According to the above-described embodiment, when the first braking force cannot be controlled due to a failure in the first frictional braking apparatus, the braking instruction for causing the second frictional braking apparatus to generate the second braking force according to the magnitude of the first braking force is output. Due to that, the second frictional braking apparatus can generate the second braking force according to the magnitude of the first braking force, i.e., the second braking force controlled so as to allow the vehicle to maintain the stable behavior. As a result, the vehicle behavior can be prevented from losing stability under the unintended braking force generated due to a failure in the frictional braking apparatus.

According to the embodiment, the acceleration/deceleration instruction is output according to the relationship between the "magnitude of the first braking force" and the "magnitude of the acceleration/deceleration request requested to the vehicle". Therefore, the acceleration/deceleration instruction can be output for generating the acceleration/deceleration corresponding to the acceleration/deceleration request requested to the vehicle with the "first braking force due to a failure in the first frictional braking apparatus" and the "second braking force by the second frictional braking apparatus based on the braking instruction" provided thereto. As a result, the acceleration/deceleration can be generated in correspondence with the acceleration/deceleration request while the vehicle behavior is prevented from losing stability.

According to the embodiment, when the acceleration/deceleration request is an acceleration request, the braking instruction is output in such a manner that the magnitude of the second braking force is smaller than the magnitude of the first braking force by the predetermined amount. Along therewith, the acceleration instruction is output so as to generate the acceleration corresponding to the sum of the "sum of the magnitude of the first braking force and the magnitude of the second braking force" and the "magnitude of the acceleration request". As a result, the acceleration can be generated in correspondence with the acceleration request with the acceleration force (the acceleration torque) reduced as much as the reduction in the magnitude of the second braking force that falls below the first braking force by the predetermined amount.

According to the embodiment, when the acceleration/deceleration request is a deceleration request and the magnitude of the deceleration request is less than twice the magnitude of the first braking force, the braking instruction is output in such a manner that the magnitude of the second braking force is smaller than the magnitude of the first braking force by the predetermined amount. Along therewith, the acceleration instruction is output so as to generate the deceleration corresponding to the difference between the "sum of the magnitude of the first braking force and the magnitude of the second braking force" and the "magnitude of the deceleration request". As a result, the deceleration can be generated in correspondence with the deceleration request with the acceleration force (the acceleration torque) reduced as much as the reduction in the magnitude of the second braking force that falls below the first braking force by the predetermined amount. In addition, the addition of the acceleration force (the acceleration torque) allows the deceleration to be generated in correspondence with the deceleration request smaller than the "sum of the magnitude of the first braking force and the magnitude of the second braking force" even with the first braking force and the second braking force provided.

According to the embodiment, when the acceleration/deceleration request is a deceleration request and the magnitude of the deceleration request is more than twice the magnitude of the first braking force, the braking instruction is output in such a manner that the magnitude of the second braking force is greater than the magnitude of the first braking force by the predetermined amount. Along therewith, the deceleration instruction is output so as to generate the deceleration corresponding to the difference between the "magnitude of the deceleration request" and the "sum of the magnitude of the first braking force and the magnitude of the second braking force". Therefore, the addition of the deceleration force (the deceleration torque) allows the deceleration to be generated in correspondence with the deceleration request greater than the "sum of the magnitude of the first braking force and the magnitude of the second braking force".

According to the embodiment, the braking instruction is output in such a manner that the magnitude of the second braking force matches the magnitude of the first braking force. As a result, the braking force can be consistent between the left side and the right side of the vehicle, and this can suppress the generation of a moment on the vehicle due to the difference between the second braking force and the first braking force.

According to the embodiment, the second braking force is determined according to the estimated moment amount to be generated by the steering apparatus of the vehicle. Therefore, the moment derived from the difference between the second braking force and the first braking force can be reduced with the aid of the moment generated by the steering apparatus of the vehicle. In other words, the moment derived from the difference between the second braking force and the first braking force can be reduced by the moment generated by the steering apparatus of the vehicle. Due to that, for example, even when a difference is generated between the second braking force and the first braking force, the generation of a moment can be suppressed by cooperating with the steering apparatus of the vehicle. In other words, even when the difference increases between the second braking force and the first braking force, the moment of the vehicle can be reduced with the aid of the moment generated by the steering apparatus of the vehicle. At this time, the acceleration/deceleration instruction can be increased/reduced according to the increase/reduction in the second braking force.

According to the embodiment, the first frictional braking apparatus is actuated by the first electric motor, and the second frictional braking apparatus is actuated by the second electric motor. Therefore, even when the first braking force provided to the first wheel cannot be controlled due to a failure in the first frictional braking apparatus actuated by the first electric motor, the second braking force can be generated by the second frictional braking apparatus actuated by the second electric motor. Due to that, for example, even when the braking force becomes unable to be released by the first frictional braking force actuated by the first electric motor, the vehicle behavior can be prevented from losing stability. For example, even when the first frictional braking apparatus is configured not to have the function of separating the friction member from the friction receiving member when the first electric motor becomes unable to be driven, the vehicle behavior can be prevented from losing stability when the first electric motor becomes unable to be driven.

According to the embodiment, the second w % heel portion is the second front wheel, which is the front wheel in the other wheel portion, or the second rear wheel, which is the rear wheel in the other wheel portion. Due to that, the second braking force can be provided to the second front wheel or the second rear wheel by the second frictional braking apparatus.

According to the embodiment, the second wheel portion includes the second front wheel and the second rear wheel, and the second frictional braking apparatus includes the second front wheel frictional braking apparatus configured to provide the braking force to the second front wheel and the second rear wheel frictional braking apparatus configured to provide the braking force to the second rear wheel. In addition thereto, the braking instruction is output in such a manner that the second braking force is generated while being distributed into the "second front wheel braking force generated by the second front wheel frictional braking apparatus" and the "second rear wheel braking force generated by the second rear wheel frictional braking apparatus". Due to that, the second braking force (the second front wheel braking force and the second rear wheel braking force) can be provided while being distributed to the second front wheel and the second rear wheel by the second front wheel frictional braking apparatus and the second rear wheel frictional braking apparatus.

The present invention shall not be limited to the above-described embodiment, and includes various modifications. For example, the above-described embodiment has been described in detail to facilitate a better understanding of the present invention, and the present invention shall not necessarily be limited to the configuration including all of the described features. Further, a part of the configuration of some embodiment can be replaced with the configuration of another embodiment. Further, some embodiment can also be implemented with a configuration of another embodiment added to the configuration of this embodiment. Further, each embodiment can also be implemented with another configuration added, deleted, or replaced with respect to a part of the configuration of this embodiment.

REFERENCE SIGNS LIST

1 vehicle
3L left front wheel (first wheel, second wheel portion, second front wheel)
3R right front wheel (first wheel, second wheel portion, second front wheel)
4L left rear wheel (first w % heel, second wheel portion, second rear wheel)
4R right rear wheel (first wheel, second wheel portion, second rear wheel)
5L left front electric brake mechanism (first frictional braking apparatus, second frictional braking apparatus, second front wheel frictional braking apparatus)
5R right front electric brake mechanism (first frictional braking apparatus, second frictional braking apparatus, second front wheel frictional braking apparatus)
6L left rear electric brake mechanism (first frictional braking apparatus, second frictional braking apparatus, second rear wheel frictional braking apparatus)
6R right rear electric brake mechanism (first frictional braking apparatus, second frictional braking apparatus, second rear wheel frictional braking apparatus)
10 first ECU (vehicle control apparatus, control unit)
10A control portion
11 second ECU (vehicle control apparatus, control unit)
11A control portion
23 electric motor (first electric motor, second electric motor)

The invention claimed is:

1. A vehicle control apparatus comprising:

a control unit configured to control a first frictional braking apparatus and a second frictional braking apparatus, the first frictional braking apparatus being configured to provide a braking force to a first wheel, which is one of a left wheel of a vehicle or a right wheel of the vehicle, the second frictional braking apparatus being configured to provide a braking force to at least one second wheel, which includes the other of the left wheel of the vehicle or the right wheel of the vehicle, wherein:

the control unit is configured to output, when a first braking force provided to the first wheel cannot be controlled due to a failure in the first frictional braking apparatus, a braking instruction for causing the second frictional braking apparatus to generate a second braking force according to a magnitude of the first braking force;

the control unit is configured to output an acceleration/deceleration instruction according to a relationship between the magnitude of the first braking force and a magnitude of an acceleration/deceleration request requested to the vehicle; and the control unit is configured to output, when the acceleration/deceleration request is a deceleration request and a magnitude of the deceleration request is less than twice the magnitude of the first braking force: (i) the braking instruction such that a magnitude of the second braking force is smaller than the magnitude of the first braking force by a predetermined amount; and (ii) an acceleration instruction of the acceleration/deceleration instruction so as to generate a deceleration corresponding to a difference between the magnitude of the deceleration request and a sum of the magnitude of the first braking force and the magnitude of the second braking force.

2. The vehicle control apparatus according to claim 1, wherein, when the acceleration/deceleration request is an acceleration request, the control portion is configured to output: (i) the braking instruction such that the magnitude of the second braking force is smaller than the magnitude of the first braking force by a predetermined amount; and (ii) the acceleration instruction of the acceleration/deceleration instruction so as to generate an acceleration corresponding to a sum of the magnitude of the first braking force, the magnitude of the second braking force and a magnitude of the acceleration request.

3. The vehicle control apparatus according to claim 1, wherein, when the acceleration/deceleration request is the deceleration request and the magnitude of the deceleration request is more than twice the magnitude of the first braking force, the control portion is configured to output: (i) the braking instruction such that the magnitude of the second braking force is greater than the magnitude of the first braking force by a predetermined amount; and (ii) a deceleration instruction of the acceleration/deceleration instruction so as to generate the deceleration corresponding to the difference between the magnitude of the deceleration request and the sum of the magnitude of the first braking force and the magnitude of the second braking force.

4. The vehicle control apparatus according to claim 1, wherein the control portion is configured to output the braking instruction such that the magnitude of the second braking force matches the magnitude of the first braking force.

5. The vehicle control apparatus according to claim 1, wherein the control portion is configured to determine the second braking force according to an estimated moment amount to be generated by a steering apparatus of the vehicle.

6. The vehicle control apparatus according to claim 1, wherein:

the first frictional braking apparatus is configured to be actuated by a first electric motor; and the second frictional braking apparatus is configured to be actuated by a second electric motor.

7. The vehicle control apparatus according to claim 1, wherein the at least one second wheel is a second front wheel or a second rear wheel.

8. The vehicle control apparatus according to claim 1, wherein:

the at least one second wheel includes a second front wheel and a second rear wheel, the second frictional braking apparatus includes a second front wheel frictional braking apparatus configured to provide a braking force to the second front wheel and a second rear wheel frictional braking apparatus configured to provide a braking force to the second rear wheel; and the control portion is configured to output the braking instruction such that the second braking force is generated while being distributed into a second front wheel braking force generated by the second front wheel frictional braking apparatus and a second rear wheel braking force generated by the second rear wheel frictional braking apparatus.

9. A vehicle control method configured to be performed by a control unit, the control unit being configured to control a first frictional braking apparatus and a second frictional braking apparatus, the first frictional braking apparatus being configured to provide a braking force to a first wheel, which is one of a left wheel of a vehicle or a right wheel of the vehicle, the second frictional braking apparatus being configured to provide a braking force to at least one second wheel, which includes the other of the left wheel of the vehicle or the right wheel of the vehicle, the vehicle control method comprising:

outputting, by the control unit, when a first braking force provided to the first wheel cannot be controlled due to a failure in the first frictional braking apparatus, a braking instruction for causing the second frictional braking apparatus to generate a second braking force according to a magnitude of the first braking force;

outputting, by the control unit, an acceleration/deceleration instruction according to a relationship between the magnitude of the first braking force and a magnitude of an acceleration/deceleration request requested to the vehicle; and outputting, by the control unit, when the acceleration/deceleration request is a deceleration request and a magnitude of the deceleration request is less than twice the magnitude of the first braking force: (i) the braking instruction such that a magnitude of the second braking force is smaller than the magnitude of first braking force by a predetermined amount; and (ii) an acceleration instruction of the acceleration/deceleration instruction so as to generate a deceleration corresponding to a difference between the magnitude of the deceleration request and a sum of the magnitude of the first braking force and the magnitude of the second braking force.

10. A vehicle control system comprising:

a first frictional braking apparatus configured to provide a braking force to a first wheel, which is one of a left wheel of a vehicle or a right wheel of the vehicle;

a second frictional braking apparatus configured to provide a braking force to at least one second wheel, which includes the other of the left wheel of the vehicle or the right wheel of the vehicle; and a control unit configured to control the first frictional braking apparatus and the second frictional braking apparatus, wherein:

the control unit is configured to output, when a first braking force provided to the first wheel cannot be controlled due to a failure in the first frictional braking apparatus, a braking instruction for causing the second frictional braking apparatus to generate a second braking force according to a magnitude of the first braking force;

the control unit is configured to output an acceleration/deceleration instruction according to a relationship between the magnitude of the first braking force and a magnitude of an acceleration/deceleration request requested to the vehicle; and the control unit is configured to output, when the acceleration/deceleration request is a deceleration request and a magnitude of the deceleration request is less than twice the magnitude of the first braking force: (i) the braking instruction such that a magnitude of the second braking force is smaller than the magnitude of the first braking force by a predetermined amount; and (ii) an acceleration instruction of the acceleration/deceleration instruction so as to generate a deceleration corresponding to a difference between the magnitude of the deceleration request and a sum of the magnitude of the first braking force and the magnitude of the second braking force.

* * * * *